United States Patent
Narumi et al.

(10) Patent No.: US 8,451,699 B2
(45) Date of Patent: May 28, 2013

(54) OPTICAL INFORMATION REPRODUCTION DEVICE, OPTICAL INFORMATION RECORDING DEVICE, OPTICAL INFORMATION REPRODUCTION METHOD, AND OPTICAL INFORMATION RECORDING METHOD

(75) Inventors: Kenji Narumi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/580,406

(22) PCT Filed: Feb. 23, 2011

(86) PCT No.: PCT/JP2011/001019
§ 371 (c)(1),
(2), (4) Date: Aug. 22, 2012

(87) PCT Pub. No.: WO2011/105068
PCT Pub. Date: Sep. 1, 2011

(65) Prior Publication Data
US 2012/0314553 A1    Dec. 13, 2012

(30) Foreign Application Priority Data
Feb. 26, 2010   (JP) ................................. 2010-041504

(51) Int. Cl.
*G11B 7/00*    (2006.01)
(52) U.S. Cl.
USPC ..................................... 369/44.32; 369/13.33
(58) Field of Classification Search
USPC .......................................... 369/44.32, 13.33
See application file for complete search history.

(56) References Cited

U.S. PATENT DOCUMENTS

| 7,106,683 | B2 | 9/2006 | Saito et al. |
| 7,394,734 | B2 * | 7/2008 | Ishimoto ............... 369/44.35 |

(Continued)

FOREIGN PATENT DOCUMENTS

| JP | 2006-344351 | 12/2006 |
| JP | 2008-243282 | 10/2008 |

(Continued)

OTHER PUBLICATIONS

International Search Report issued May 31, 2011 in International (PCT) Application No. PCT/JP2011/001019.

*Primary Examiner* — Wayne Young
*Assistant Examiner* — Brenda Bernardi
(74) *Attorney, Agent, or Firm* — Wenderoth, Lind & Ponack, L.L.P.

(57) ABSTRACT

The present invention accurately operates a tilt servo even if a gap servo is operated with a small gap. A condensing unit (102) generates a near-field light and condenses a laser beam on an optical disk (1), a light quantity detection unit (104) detects light quantity of return light from an area where the near-field light is generated, a gap control unit (105) controls a gap between the condensing unit (102) and the optical disk (1) based on the light quantity of the return light, a tilt calculation unit (106) calculates, in a state of controlling the gap, an inclination amount between the condensing unit (102) and the optical disk (1) based on the light quantity of the return light, a tilt error signal generation unit (107) generates from the inclination amount a tilt error signal, which is a signal from which a fluctuation component of the return light generated due to decentering of the optical disk (1) is removed, and a tilt control unit (108) controls the inclination between the condensing unit (102) and the optical disk (1) based on the tilt error signal.

14 Claims, 15 Drawing Sheets

U.S. PATENT DOCUMENTS

| | | | |
|---|---|---|---|
| 7,406,016 B2 * | 7/2008 | Ishimoto | 369/53.28 |
| 7,440,383 B2 * | 10/2008 | Saito et al. | 369/112.24 |
| 7,462,855 B2 | 12/2008 | Saito et al. | |
| 7,535,808 B2 * | 5/2009 | Ishimoto et al. | 369/53.22 |
| 7,613,082 B2 * | 11/2009 | Ishimoto et al. | 369/44.32 |
| 7,764,576 B2 | 7/2010 | Asai | |
| 7,808,866 B2 | 10/2010 | Lee et al. | |
| 2004/0013077 A1 | 1/2004 | Saito et al. | |
| 2006/0255247 A1 | 11/2006 | Saito et al. | |
| 2006/0274610 A1 | 12/2006 | Saito et al. | |
| 2007/0091743 A1 | 4/2007 | Lee et al. | |
| 2007/0297301 A1 * | 12/2007 | Verschuren | 369/44.32 |
| 2008/0239890 A1 | 10/2008 | Asai | |
| 2009/0303852 A1 * | 12/2009 | Bakx | 369/53.28 |
| 2011/0007613 A1 * | 1/2011 | Ito et al. | 369/44.11 |
| 2011/0141864 A1 * | 6/2011 | Lin et al. | 369/44.14 |

FOREIGN PATENT DOCUMENTS

| | | |
|---|---|---|
| JP | 2009-508287 | 2/2009 |
| WO | 03/021583 | 3/2003 |

* cited by examiner

OPTICAL INFORMATION REPRODUCTION DEVICE, OPTICAL INFORMATION RECORDING DEVICE, OPTICAL INFORMATION REPRODUCTION METHOD, AND OPTICAL INFORMATION RECORDING METHOD

TECHNICAL FIELD

The present invention relates to an optical information reproduction device that optically reproduces information, an optical information recording device that optically records information, an optical information reproduction method for optically reproducing information and an optical information recording method for optically recording information, and more particularly to an optical information reproduction device, an optical information recording device, an optical information reproduction method and an optical information recording method using a near-field light.

BACKGROUND ART

A technique of using a near-field light has been suggested as a technique to record or reproduce data on or from an optical disk at higher density.

As condensing means for generating a near-field light, an optical system combining a condensing lens and a solid immersion lens (hereafter also called "SIL") is attracting attention lately. If a condensing lens and an SIL are combined, the condensing means can implement a higher numerical aperture than a numerical aperture of the condensing lens. Since increasing the numerical aperture of the condensing means makes it possible to decrease the size of the spot, higher density recording becomes possible.

In the case of an optical system using an SIL, light emitted from the emitting surface of the SIL must enter the surface of the optical disk, therefore it is demanded that the distance between the SIL and the surface of the optical disk is extremely short. In the case of an optical system used for reproducing information from a DVD or the like, the distance between the objective lens and the surface of the optical disk is about 1 mm. Whereas in the case of an optical system using an SIL, the distance between the emitting surface of the SIL and the surface of the optical disk (hereafter also called "gap") must be controlled to be at most several tens nm. In order to implement this control, a method called "gap servo" (or gap control) has been suggested. Gap servo is disclosed in Patent Literature 1.

Further, in the case of the optical system using the SIL, the distance between the emitting surface of the SIL and the surface of the optical disk is short, as mentioned above. Therefore if the emitting surface of the SIL and the surface of the optical disk are relatively inclined toward each other, the SIL may collide with the optical disk. The tolerance of this inclination is much smaller than the case of a DVD or the like. The inclination (hereafter also called "tilt") could be generated by a warp generated when manufacturing the optical disk, or by an error generated upon assembling the optical system. Therefore not only the gap servo, but also a control to make the emitting surface of the SIL and the surface of the optical disk parallel with each other (this is called "tilt servo" or "tilt control") is required in order to reproduce information using the SIL.

A method for operating the tilt servo using the near-field light is disclosed in Patent Literature 2, for example. In the case of the method disclosed in Patent Literature 2, if the emitting surface of the SIL and the surface of the optical disk are not parallel, in the SIL emitting surface the distance between the emitting surface and the surface of the disk becomes inconstant, and distribution of light quantity of the spot of the returned light reflected on the emitting surface of the SIL becomes uneven. Using this phenomena, the return light spot is detected by a divided detector, and a signal indicating the tilt between the emitting surface of the SIL and the surface of the optical disk is obtained, so as to control the inclination of the condensing means based on this signal.

According to the method disclosed in Patent Literature 2, if the condensing means shifts in the radius direction due to decentering of the optical disk, the position of the return light spot shifts on the detector, and an error is generated in the signal to be obtained. A method for avoiding this problem is disclosed in Patent Literature 3, for example. According to the method disclosed in Patent Literature 3, the form of the detector is divided so that the quantity of light that enters the detector for inclination detection does not change, even if the spot shifts in the radius direction in a state where the intensity of the annular area of the return light spot is high.

In the above mentioned conventional method, however, the following problems exist.

In order to reproduce information at high quality in the optical system using the SIL, the gap must be minimized so that optical transmission efficiency between the SIL and the optical disk is increased. The intensity of the return light spot in the annular area depends on the intensity of the beam that satisfies n·sin β>1 (n is a refractive index of the lens medium, and β is an incident angle of the beam) reflecting on the surface of the SIL. As the gap becomes smaller, a component of the beam that satisfies n·sin β>1 is transmitted more to the optical disk, so the intensity of the annular area decreases, and the difference of the intensities between the annular area and the inner side of the annular area decreases. As a result, even if the detector is divided using the method disclosed in Patent Literature 3, the quantity of light that enters the detector for inclination detection changes if the spot shifts in the radius direction in a state where gap servo is operated with a small gap.

CITATION LIST

Patent Literature

Patent Literature 1: WO 2003/021583
Patent Literature 2: Japanese Patent Application Laid-Open No. 2006-344351
Patent Literature 3: Japanese Patent Application Laid-Open No. 2008-243282

SUMMARY OF INVENTION

With the foregoing in view, it is an object of the present invention to provide an optical information reproduction device, an optical information recording device, an optical information reproduction method and an optical information recording method, which allow the tilt servo to operate accurately, even if the gap servo is operated with a small gap.

An optical information reproduction device according to an aspect of the present invention is an optical information reproduction device for reproducing information from an optical information recording medium, comprising: a light source that emit a laser beam; a condensing unit that generates a near-field light and condenses the laser beam on the optical information recording medium; a rotation unit that rotates the optical information recording medium; a light quantity detection unit that detects light quantity of return light from an area where the near-field light is generated; a gap control unit that controls a gap between the condensing unit and the optical information recording medium based on the light quantity of the return light detected by the light quantity detection unit; a tilt calculation unit that calculates, in a state where the gap is controlled by the gap control unit, an inclination amount between the condensing unit and the optical information recording medium based on the light quantity of the return light detected by the light quantity detection unit; a tilt error signal generation unit that generates from the inclination amount calculated by the tilt calculation unit a tilt error signal, which is a signal from which a fluctuation component of the return light generated due to decentering of the optical information recording medium is removed; and a tilt control unit that controls the inclination between the condensing unit and the optical information recording medium based on the tilt error signal generated by the tilt error signal generation unit.

According to this configuration, the light source emits a laser beam, and the condensing unit generates a near-field light and condenses the laser beam on the optical information recording medium. The rotation unit rotates the optical information recording medium. The light quantity detection unit detects light quantity of return light from an area where the near-field light is generated. The gap control unit controls a gap between the condensing unit and the optical information recording medium based on the light quantity of the return light detected by the light quantity detection unit. The tilt calculation unit calculates, in a state of the gap control unit controlling the gap, an inclination amount between the condensing unit and the optical information recording medium based on the light quantity of the return light detected by the light quantity detection unit. The tilt error signal generation unit generates a tilt error signal, which is a signal without a fluctuation component of the return light generated due to decentering of the optical information recording medium, from the inclination amount calculated by the tilt calculation unit. The tilt control unit controls the inclination between the condensing unit and the optical information recording medium based on the tilt error signal generated by the tilt error signal generation unit.

According to the present invention, an inclination amount between the condensing unit and the optical information recording medium is calculated based on the light quantity of the return light, in a state of controlling the gap, and the tilt error signal, which is a signal without a fluctuation component of the return light generated due to decentering of the optical information recording medium, is generated from the calculated inclination amount, therefore the tilt servo can be accurately operated even if the gap servo is operated with a small gap between the condensing unit and the optical information recording medium, and information recorded on the optical information recording medium at high density can be stably reproduced with high quality.

Objects, features and advantages of the present invention will become more apparent upon reading the following detailed description along with the accompanying drawings.

BRIEF DESCRIPTION OF DRAWINGS

FIG. 4 are diagrams depicting states of the first embodiment of the present invention, where

FIG. 5 are diagrams depicting states of the first embodiment of the present invention, where

FIG. 6 are diagrams depicting states of the first embodiment of the present invention, where

DESCRIPTION OF EMBODIMENTS

Embodiments of the present invention will now be described with reference to the accompanying drawings. The following embodiments are examples of carrying out the invention, and are not intended to limit the technical scope of the present invention.

First Embodiment

Figure 1:
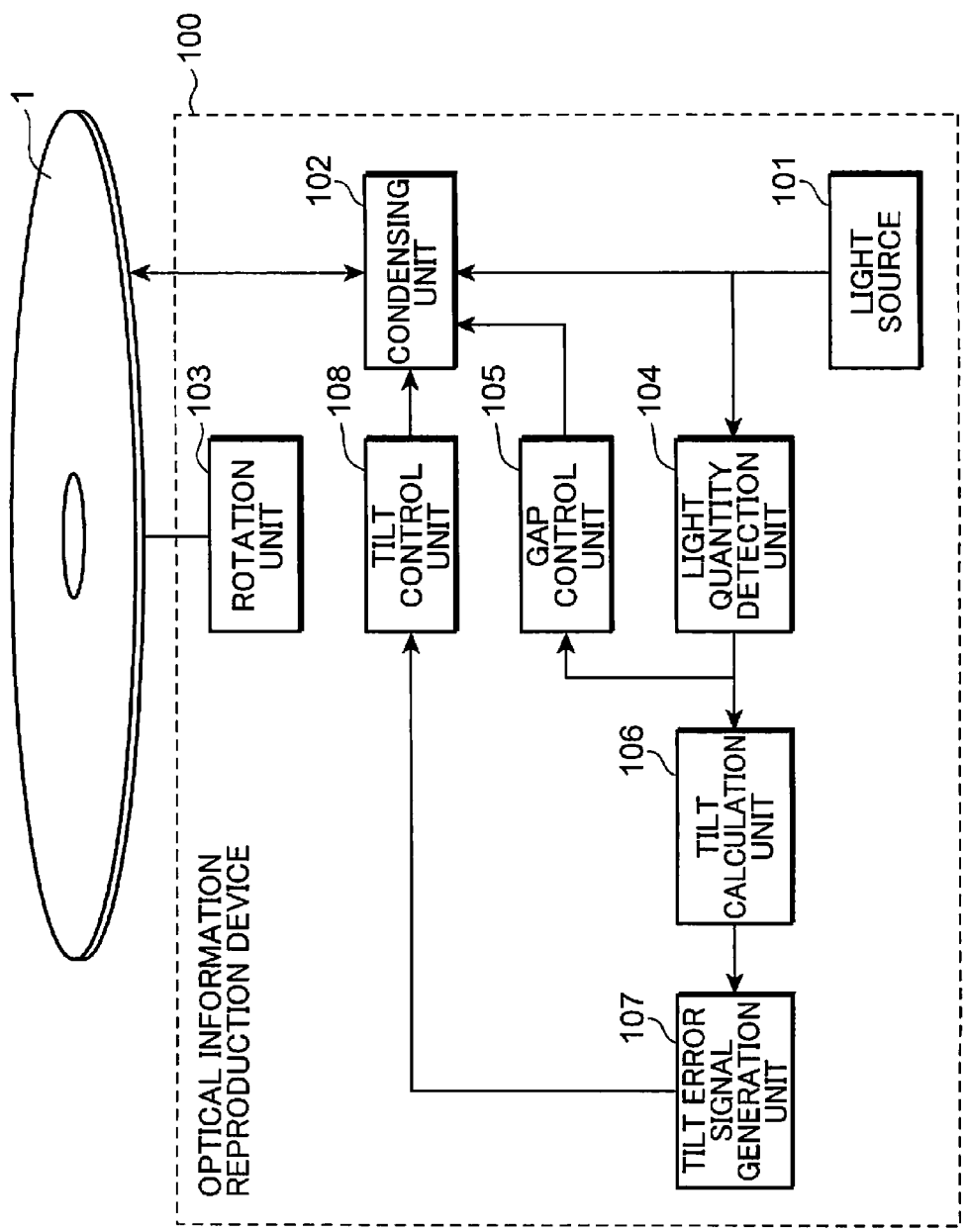
FIG. 1 is a functional block diagram depicting a configuration of an optical information reproduction device according to a first embodiment of the present invention.

FIG. 1 is a functional block diagram depicting a configuration of an optical information reproduction device according to a first embodiment of the present invention.

The optical information reproduction device 100 comprises a light source 101, a condensing unit 102, a rotation unit 103, a light quantity detection unit 104, a gap control unit 105, a tilt calculation unit 106, a tilt error signal generation unit 107 and a tilt control unit 108.

The optical information reproduction device 100 is a device for recording and/or reproducing information on/from an optical disk 1, which is an optical information recording medium.

The light source 101 emits a laser beam. The condensing unit 102 generates a near-field light and condenses a laser beam on the optical disk 1. The rotation unit 103 rotates the optical disk 1. The light quantity detection unit 104 detects a light quantity of return light from an area where the near-field light is generated.

The gap control unit 105 controls a gap between the condensing unit 102 and the optical disk 1 based on the light quantity of the return light detected by the light quantity detection unit 104. The tilt calculation unit 106 calculates, in a state of the gap control unit 105 controlling the gap, an inclination amount between the condensing unit 102 and the optical disk 1, based on the light quantity of the return light detected by the light quantity detection unit 104.

The tilt error signal generation unit 107 generates a tilt error signal, which is a signal without a fluctuation component of the return light generated due to decentering of the optical disk 1, from the inclination amount calculated by the tilt calculation unit 106. The tilt control unit 108 controls the inclination between the condensing unit 102 and the optical disk 1, based on the tilt error signal generated by the tilt error signal generation unit 107.

Figure 2:
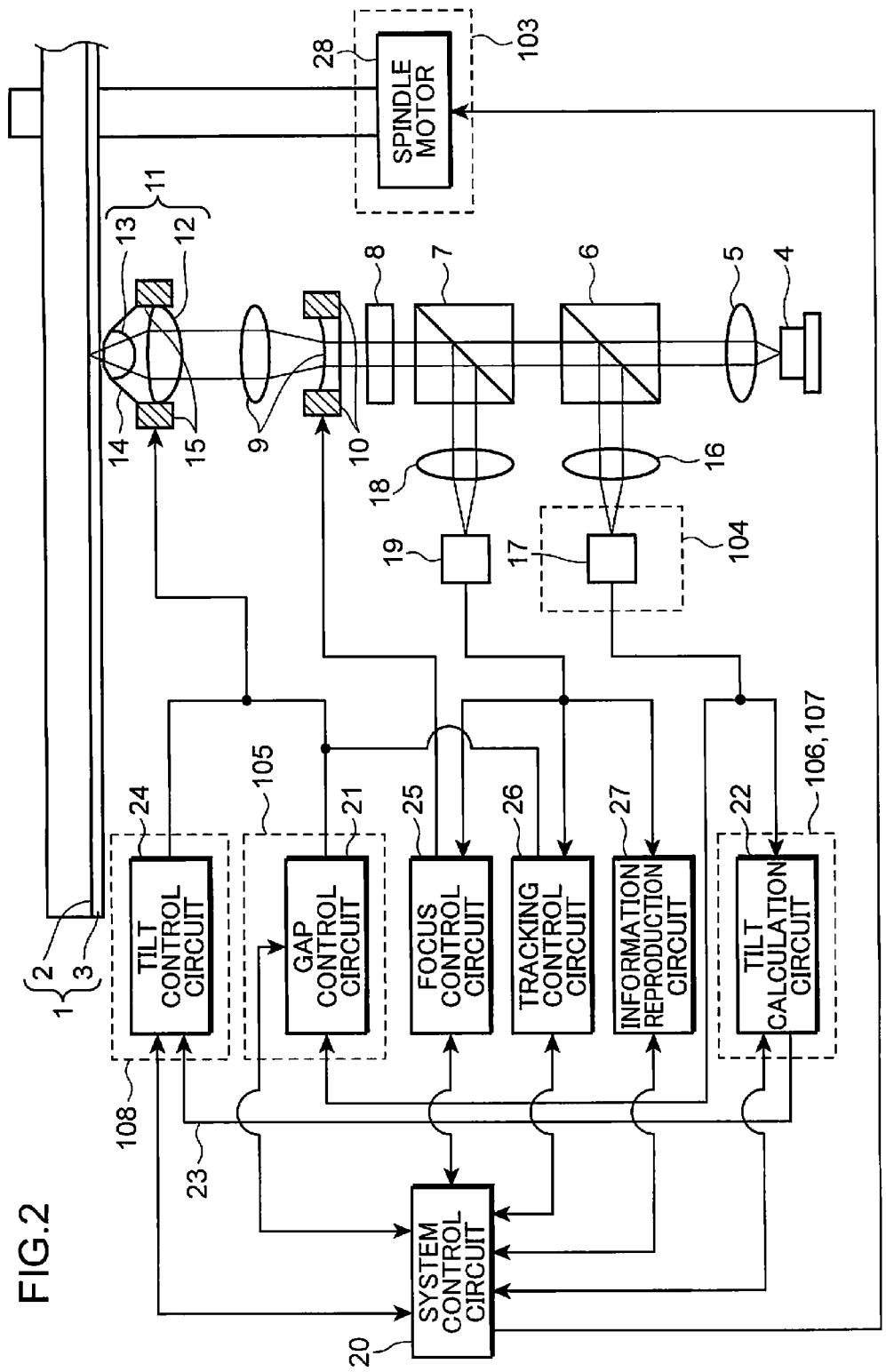
FIG. 2 is a diagram depicting a general configuration of the optical information reproduction device according to the first embodiment of the present invention.

A general configuration of the optical information reproduction device according to the first embodiment will now be described with reference to FIG. 2. FIG. 2 is a diagram depicting the general configuration of the optical information reproduction device according to the first embodiment of the present invention.

The optical information reproduction device shown in FIG. 2 comprises a laser light source 4, a collimator lens 5, a non-polarization beam splitter 6, a polarization beam splitter 7, a quarter wavelength plate 8, a beam expander 9, an actuator 10, a condensing unit 11, a lens holder 14, an actuator 15, a first detection lens 16, a first detector 17, a second detection lens 18, a second detector 19, a system control circuit 20, a gap control circuit 21, a tilt calculation circuit 22, a tilt control circuit 24, a focus control circuit 25, a tracking control circuit 26 and an information reproduction circuit 27.

First a configuration of an outward path optical system, that exists in an optical path from the laser light source 4 to the optical disk 1, and a configuration of the optical disk 1, will be described.

The optical disk 1 is an optical disk for recording or reproducing data. The optical disk 1 includes an information layer 2 where information is actually recorded, and a cover layer 3 for protecting the information layer. The cover layer 3 is unnecessary in the case of condensing a laser beam on the surface of the optical disk 1. The laser light source 4 emits a laser beam. The laser light source 4 corresponds to the light source 101. The collimator lens 5 transforms the laser beam emitted from the laser light source 4 into a parallel beam.

The non-polarization beam splitter 6 and the polarization beam splitter 7 are both beam splitters for separating a reflected light from the optical disk 1. The non-polarization beam splitter 6 is a type of beam splitter of which reflection characteristic does not depend on the polarization direction, and the polarization beam splitter 7 is a type of beam splitter of which reflection characteristic depends on the polarization direction. The non-polarization beam splitter 6 separates return light from an area where the near-field light is generated (area near the emitting surface of SIL 13 in the case of the first embodiment), and the polarization beam splitter 7 separates a reflected light from the information layer 2 (that is, the reflected light of a far-field light). The quarter wavelength plate 8 transforms a linearly polarized light into a circularly polarized light so that the polarization beam splitter 7 can separate the reflected light of the far-field light.

The beam expander 9 expands or contracts the beam diameter of a laser beam. The actuator 10 is installed on at least one of two lenses constituting the beam expander 9. The actuator 10 adjusts the distance between the two lenses. Thereby the focusing position of the laser beam on the optical disk 1 in the optical axis direction can be adjusted. The means of adjusting the focusing position is not limited to the beam expander 9, but a lens or an optical element for adjusting the focusing position may be installed on the optical path independently from the beam expander 9. In the case of adjusting the condensing position in the optical axis direction using only the condensing unit 11, the beam expander 9 is not always necessary.

The condensing unit 11 generates a near-field light, and condenses the laser beam on the optical disk 1. The condensing unit 11 corresponds to the condensing unit 102. The condensing unit 11 is constituted by two lenses: the condensing lens 12 and the SIL 13. The condensing lens 12 condenses the laser beam on the SIL 13. The SIL 13 generates the near-field light. The SIL 13 is a semi-sphere, for example, and a lens, of which plane side of the semi-sphere is tapered, is used. The SIL 13 is disposed so that the plane side of the SIL 13 faces the surface of the optical disk 1.

The condensing lens 12 and the SIL 13 are secured together by the lens holder 14, and the actuator 15 is installed in the lens holder 14. By driving the actuator 15, the distance between the surface of the optical disk 1 and the SIL 13, the position of the condensing unit 11 in the radius direction, and the inclination of the condensing unit 11 including the SIL 13, are adjusted. If the optical disk 1 is decentered, the center of the optical axis and the center of the condensing unit 11 do not match and the position of the return light spot is shifted when the gap control, focus control and tracking control are operated with rotating the optical disk 1.

Now a return path optical system from the optical disk 1 to the first detector 17 and the second detector 19 will be described.

The return path light reflected by the non-polarization beam splitter 6 is condensed by the first detection lens 16 and enters the first detector 17. The light quantity of the light that enters the first detector 17 corresponds to the light quantity of the return light from the area where the near-field light is generated (area near the emitting surface of the SIL 13, in the case of this embodiment). The light quantity of the return light changes depending on the distance between the SIL 13 and the surface of the optical disk 1. If the SIL 13 and the surface of the optical disk 1 are in complete contact with each other, transmission of the outward path light which entered the SIL 13 to the surface of the optical disk 1 is maximum, therefore the light quantity of the return light is minimum. If the SIL 13 and the surface of the optical disk 1 are sufficiently apart from each other, on the other hand, the light in the annular area of light which entered the SIL 13 is totally reflected on the emitting surface of the SIL 13, and the light quantity of the return light becomes maximum. In a case between the above two cases, the light quantity of the return light changes approximately in proportion to the distance between the SIL 13 and the optical disk 1. Hence the distance between the SIL 13 and the surface of the optical disk 1 can be detected by detecting the total light quantity of the light that enters the first detector 17. The first detector 17 of the first embodiment corresponds to the light quantity detection unit 104. Details on the configuration of the first detector 17 will be described later.

The return path light reflected by the polarization beam splitter 7 is condensed by the second detection lens 18, and enters the second detector 19. The light that enters the second detector 19 corresponds to the light reflected by the information layer 2 of the optical disk 1. In a state of the near-field light being generated, the optical transmission efficiency between the SIL 13 and the optical disk 1 increases, and the reflected light from the information layer 2 can be received.

The second detection lens 18 is used not only for condensing light to the second detector 19, but also for detecting the focus state. For example, the second detection lens 18 may be a combination lens for detecting the focus state using an astigmatism method. The second detector 19 is used for detecting the focus state and the tracking state. Therefore it is preferable that the second detector 19 has a form where the light receiving element is divided into a plurality of areas.

Now an electric system and a control system of the optical information reproduction device will be described.

The system control circuit 20 controls the electric system and the control system of the optical information reproduction device.

The light quantity of the light received by the first detector 17 is converted into an electric signal. This electric signal is information generated by converting a current value in proportion to the light quantity, a voltage value in proportion to the light quantity, or a value in proportion to the light quantity, for example, into a digital value. An electric signal in proportion to the total light quantity is sent from the first detector 17 to the gap control circuit 21. An electric signal that is sent from the first detector 17 to the tilt calculation circuit 22 will be described later.

The gap control circuit 21 outputs drive current to the actuator 15 in order to adjust the position of the condensing unit 11 in the optical axis direction. The gap control circuit 21 changes the drive current of the actuator 15 so that an electric signal in proportion to the total light quantity received by the first detector 17 becomes a predetermined value, and servo-controls the gap between the SIL 13 and the surface of the optical disk 1 so as to be maintained at a predetermined value. It is preferable that the gap control circuit 21 controls the gap between the SIL 13 and the surface of the optical disk 1 to be a distance at which the near-field light is generated, such as ¼ or less of the wavelength of the laser beam. The gap control circuit 21 corresponds to the gap control unit 105.

The tilt calculation circuit 22 calculates the inclination amount between the emitting surface of the SIL 13 and the surface of the optical disk 1. Based on the calculated inclination amount, the tilt calculation circuit 22 generates a tilt error signal 23, which is a signal without a fluctuation component of the return light generated due to decentering of the optical disk 1. The tilt calculation circuit 22 corresponds to the tilt calculation unit 106 and the tilt error signal generation unit 107. Details on the configuration of the tilt calculation circuit 22 will be described later.

The tilt calculation circuit 22 outputs a tilt error signal 23. The tilt error signal 23 is information generated by digitizing an electric signal, such as a voltage value that is in proportion to an inclination value, or an inclination value. Normally the tilt error signal 23 is zero if the emitting surface of the SIL 13 and the surface of the optical disk 1 are parallel, and has a value in proportion to the angle of inclination, with a positive or negative sign according to the direction of the inclination. The direction of the inclination may be the radius direction (also called "radial direction") of the optical disk 1 or may be the track direction (also called "tangential direction") of the optical disk 1. The tilt calculation circuit 22 may calculate the inclination in the radius direction and both inclinations in the track direction independently, or the tilt control circuit 24 may control the inclination in the radius direction and both inclinations in the track direction independently.

The tilt error signal 23 is sent to the tilt control circuit 24. The tilt control circuit 24 corresponds to the tilt control unit 108. The tilt control circuit 24 changes the drive current of the actuator 15 so that the value of the inclination of the tilt error signal 23 becomes zero. For example, if the drive current of the actuator 15 on the left of the condensing unit 11 in FIG. 2 and the drive current of the actuator 15 on the right thereof are independently set, the inclination between the surface of the optical disk 1 and the emitting surface of the SIL 13 in the radius direction can be controlled.

The focus control circuit 25 and the tracking control circuit 26 control the focus state and the tracking state respectively based on the light received by the second detector 19. The focus control circuit 25 changes the drive current of the actuator 10 so that the electric signal (focus error signal) from the second detector 19 becomes zero or a predetermined value, and servo-controls the position of the beam expander 9 in the optical axis direction, so that the focus position of the laser beam is maintained in the position of the information layer 2. The tracking control circuit 26 changes the drive current of the actuator 15 so that the electric signal (tracking error signal) from the second detector 19 becomes zero or a predetermined value, and controls the position of the condensing unit 11 in the radius direction so that the spot of the laser beam traces the guide groove (not illustrated) formed on the information layer 2.

The information reproduction circuit 27 reproduces information that is recorded as a pit or a mark in the information layer 2 using an electric signal that is in proportion to the reflected light quantity from the information layer 2. The information reproduction circuit 27 includes a reproduction signal processing circuit and a demodulation circuit.

The spindle motor 28 rotates the optical disk 1. The spindle motor 28 corresponds to the rotation unit 103 in FIG. 1.

Figure 3:
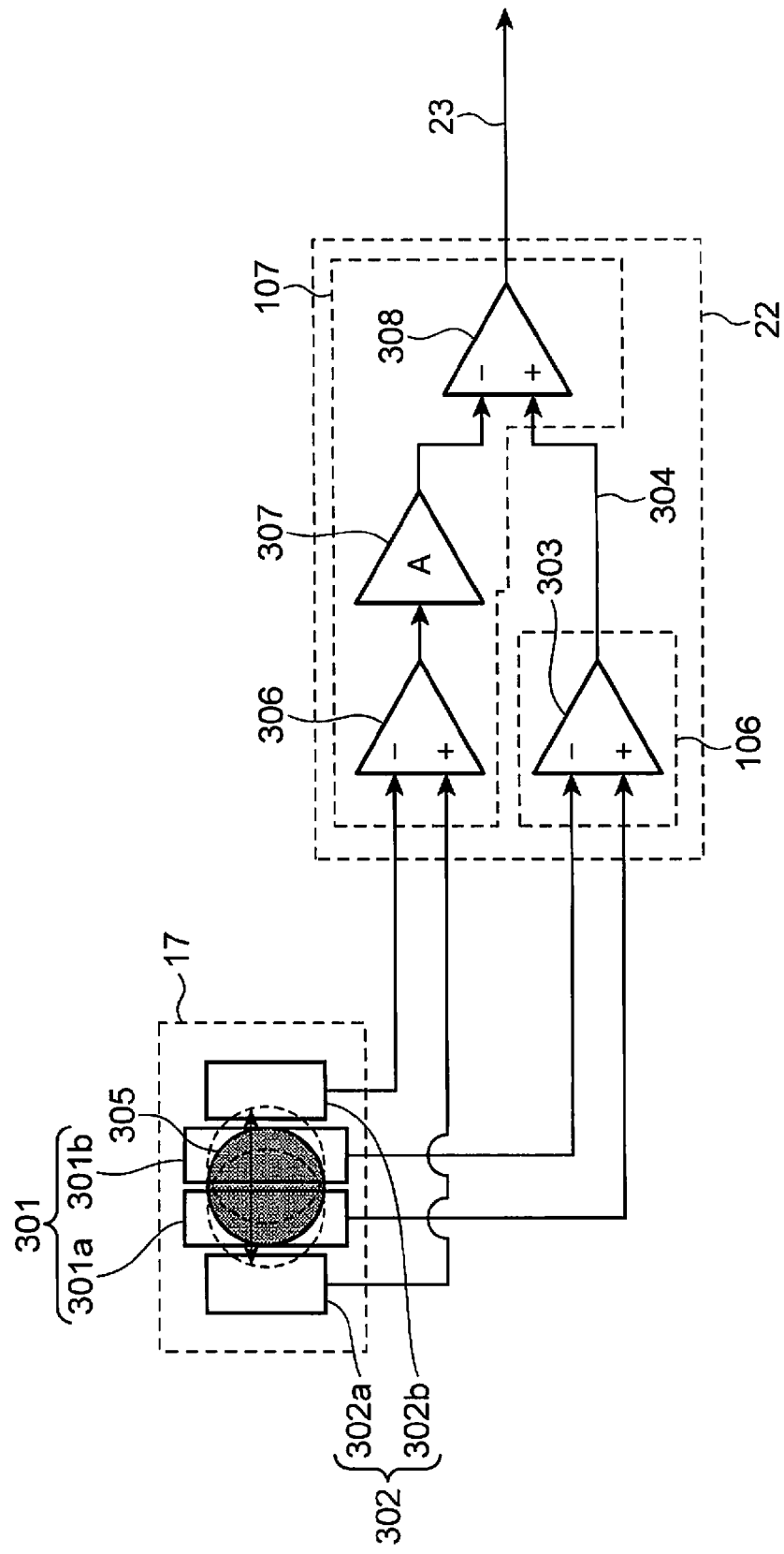
FIG. 3 is a diagram depicting a configuration of a first detector and a tilt calculation circuit according to the first embodiment of the present invention.

Now the configuration of the first detector 17 (light quantity detection unit 104) and the tilt calculation circuit 22 (tilt calculation unit 106 and tilt error signal generation unit 107) will be described with reference to FIG. 3. FIG. 3 is a diagram depicting the configuration of the first detector and the tilt calculation circuit according to the first embodiment of the present invention.

The first detector 17 is divided into four photodiodes. If the position of the return light spot 305 is not shifted, the return light spot 305 is irradiated onto a first photodiode 301. The first photodiode 301 is divided into at least two areas with respect to the center of the return light spot 305. The first photodiode 301 detects the light quantity of the return light in order to calculate the inclination amount between the condensing unit 11 and the optical disk 1. The first photodiode 301 corresponds to the light quantity detection unit for inclination amount detection. In the first embodiment, the first photodiode 301 includes a first detection area 301a and a second detection area 302b, which are located adjacent to each other in a direction where the return light spot moves by fluctuation of the return light generated due to decentering of the optical disk 1. The optical axis of the return light is adjusted so that the center of the spot matches with the dividing portion.

The first photodiode 301 detects a distribution of light quantity of the return light. If inclination is generated between the emitting surface of the SIL 13 and the surface of the optical disk 1, the distance between the emitting surface and the surface of the optical disk 1 changes depending on the position of the emitting surface. Therefore if the inclination exists, the intensity distribution of the return light spot 305 becomes uneven with respect to the center of the spot, and light quantity becomes different between the two photodiodes (first detection area 301a and second detection area 302b). A signal (electric signal in proportion to the light quantity) detected by each photodiode (first detection area 301a and second detection area 302b) is output to the first subtraction circuit 303. The first subtraction circuit 303 obtains a differential signal 304 according to the inclination by subtracting a signal detected in the second detection area 301b from a signal detected in the first detection area 301a. The steps thus far are the same as a conventional optical information reproduction device. Conventionally this differential signal 304 is regarded as a tilt error signal.

A difference from the conventional optical information reproduction device is as follows. The first detector 17 further includes a second photodiode 302 which corresponds to the light quantity detection unit for decentering detection. The second photodiode 302 detects a part of light quantity of the return light in order to detect a fluctuation component generated due to decentering of the optical disk 1. The second photodiode 302 includes a third detection area 302a which is located adjacent to the first detection area 301a in the direction where the return light spot moves by fluctuation of the return light generated due to decentering of the optical disk 1, and a fourth detection area 302b which is located adjacent to the second detection area 301b in the direction where the return spot moves by fluctuation of the return light generated due to decentering of the optical disk 1. The second photodiode 302 is disposed so that a part of the return light spot 305 enters when the return light spot 305 is shifted. The reason why the second photodiode is disposed this way will be described with reference to FIG. 4A to FIG. 6C.

Figure 4A:
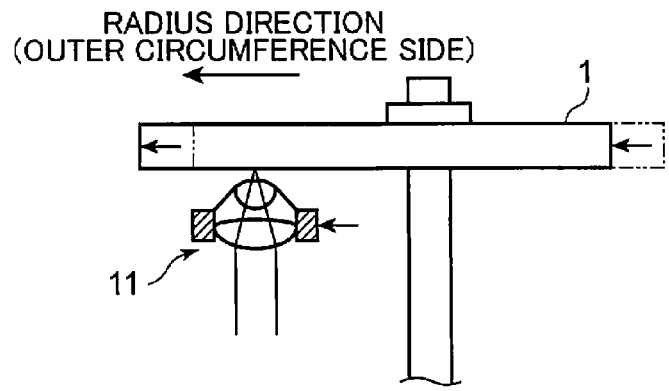
FIG. 4A is a state when a predetermined track is located on the outermost circumference side.
Figure 4B:
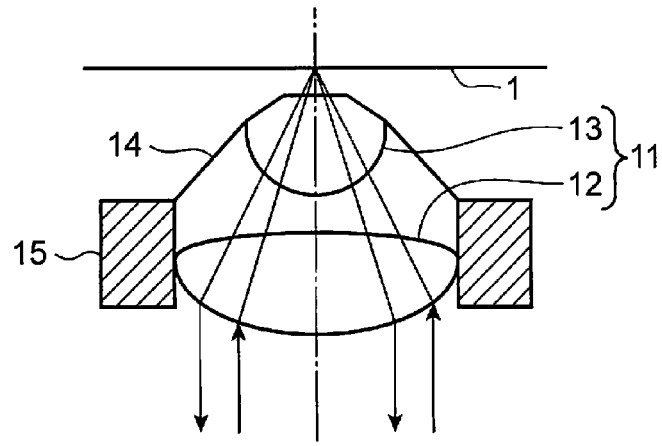
FIG. 4B is a state when the condensing unit is shifted to the outer circumference side, the center of the optical axis of the incident light is shifted to the inner circumference side and the center of the optical axis of the return light is shifted to the outer circumference side.
Figure 4C:
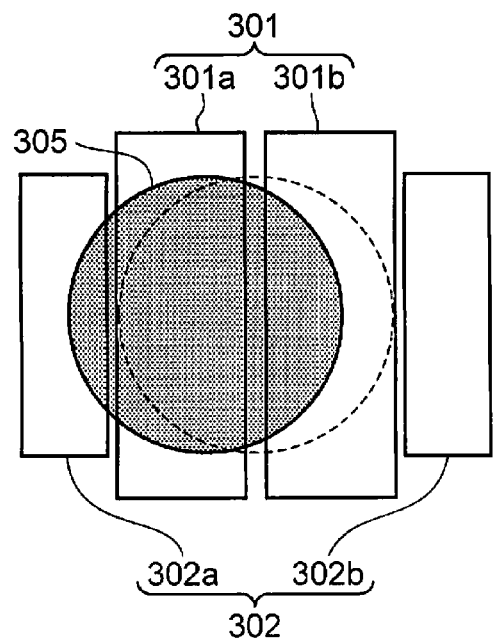
FIG. 4C is a state when the condensing unit is shifted to the outer circumference side and the return light spot is shifted to the left side of FIG. 4C.
Figure 5A:
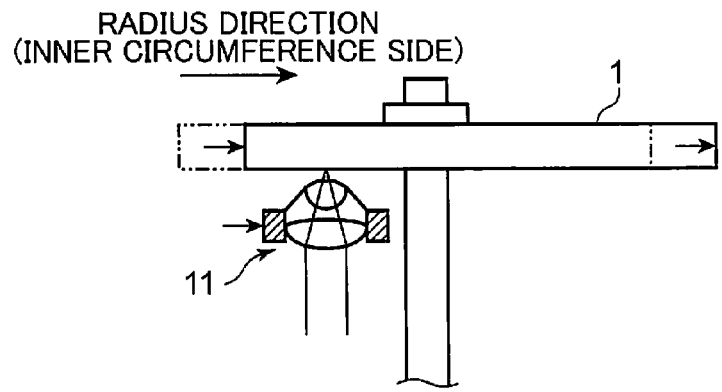
FIG. 5A is a state when the predetermined track is located on the innermost circumference side.
Figure 6A:
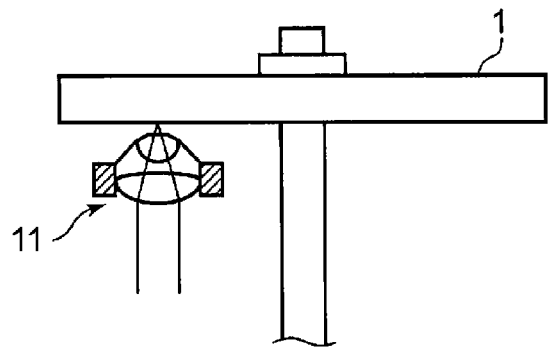
FIG. 6A is a state when the predetermined track is located on a position between FIG. 4A and FIG. 5A.

FIG. 4A to FIG. 4C are diagrams depicting states of the condensing unit 11 and the return light spot 305 when the decentered optical disk 1 is rotated. If the decentered optical disk 1 is rotated, a position of a track on the optical disk 1 in the radius direction changes depending on the rotation angle of the optical disk 1. FIG. 4A shows a state when the predetermined track is located on the outermost circumference side in the first embodiment of the present invention. FIG. 5A shows a state when the predetermined track is located on the innermost circumference side in the first embodiment of the present invention. FIG. 6A shows a state when the predetermined track is located on a position between FIG. 4A and FIG. 5A in the first embodiment of the present invention.

When the tracking control is operating, the condensing unit 11 follows up with the change of the position of the track in the radius direction, so the condensing unit 11 shifts in the radius direction even if the same track is being reproduced.

Figure 5B:
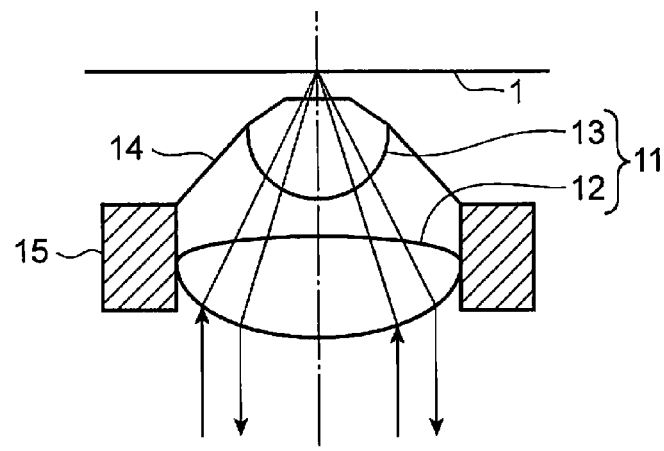
FIG. 5B is a state when the condensing unit is shifted to the inner circumference side, the center of the optical axis of the incident light is shifted to the outer circumference side and the center of the optical axis of the return light is shifted to the inner circumference side.
Figure 6B:
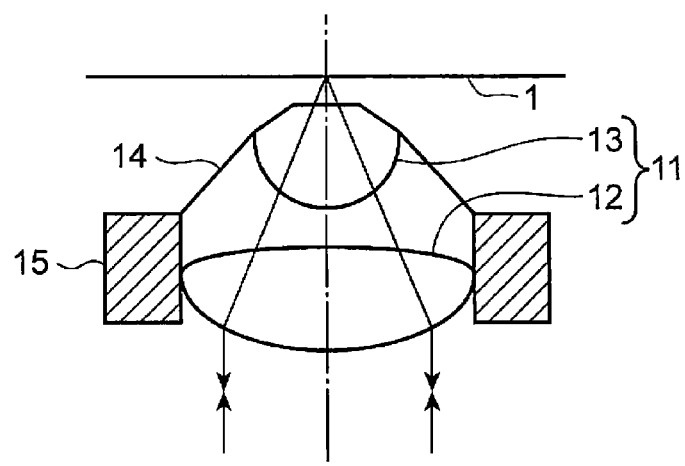
FIG. 6B is a state when the center of the optical axis of the incident light and the return light matches with the center of the condensing unit.

Therefore the center of the condensing unit 11 and the center of the optical axis of the incident light to the condensing unit 11 do not match, and the center of the optical axis of the return light and the center of the optical axis of the incident light are shifted in opposite directions from each other. In other words, FIG. 4B shows a state when the condensing unit 11 is shifted to the outer circumference side, the center of the optical axis of the incident light is shifted to the inner circumference side, and the center of the optical axis of the return light is shifted to the outer circumference side. FIG. 5B conversely shows a state when the condensing unit 11 is shifted to the inner circumference side, the center of the optical axis of the incident light is shifted to the outer circumference side, and the center of the optical axis of the return light is shifted to the inner circumference side. FIG. 6B shows a state when the center of the optical axis of the incident light and the return light matches with the center of the condensing unit 11, since the condensing unit 11 is not shifted from the position where it should be when the optical disk 1 is not decentered.

Figure 5C:
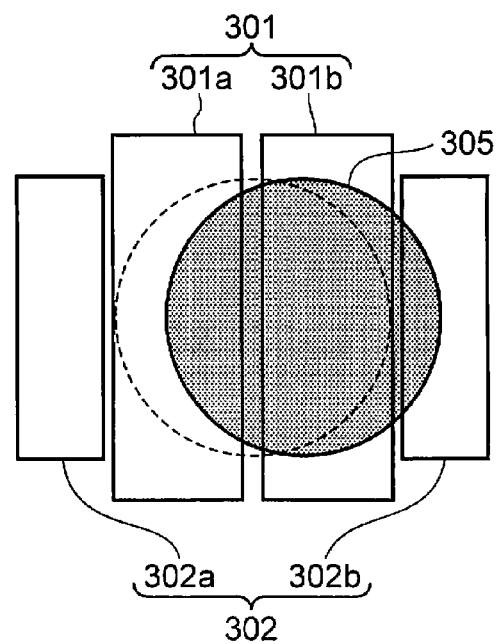
FIG. 5C is a state when the condensing unit is shifted to the inner circumference side and the return light spot is shifted to the right side of FIG. 5C.
Figure 6C:
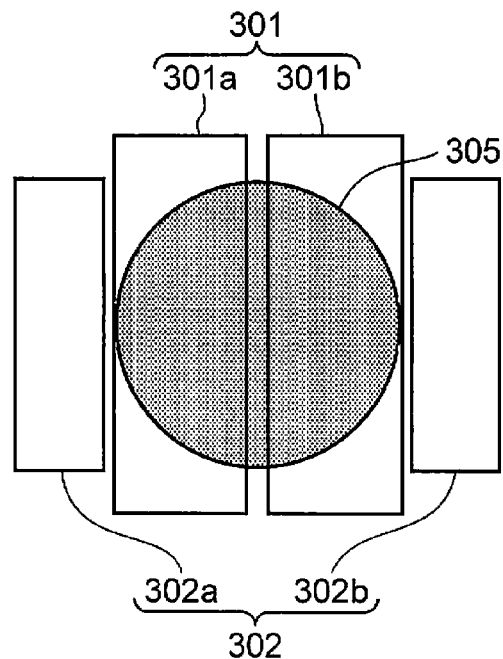
FIG. 6C is a state when the center of the return light spot matches with the center of the first photodiode.

As a result, the position of the return light spot 305 on the first photodiode 301 is also shifted in proportion to the shift of the condensing unit 11. In other words, FIG. 4C shows a state when the condensing unit 11 is shifted to the outer circumference side, and the return light spot 305 is shifted to the left side of FIG. 4C. FIG. 5C shows a state when the condensing unit 11 is shifted to the inner circumference side, and the return light spot 305 is shifted to the right side of FIG. 5C. FIG. 6C shows a state when the center of the return light spot 305 matches with the center of the first photodiode 301, since the condensing unit 11 is not shifted from the position where is should be when the optical disk 1 is not decentered.

Therefore if the second photodiode 302 is disposed outside the first photodiode 301, a part of the return light spot 305 enters the second photodiode 302 according to the decentering amount of the optical disk 1. As a result, a value corresponding to the decentering amount can be detected using the second photodiode 302.

Furthermore according to the first embodiment, an error (fluctuation component), that occurs to the tilt error signal when the return light spot 305 is shifted, is removed using a second subtraction circuit 306, an amplification circuit 307 and a third subtraction circuit 308, as shown in FIG. 3. The second subtraction circuit 306 is necessary because the polarity of the error component generated by the shift of the return light spot 305 changes depending on the direction of the return light spot 305 to be shifted.

The signals detected by the first detection area 301a and the second detection area 302b (electric signals in proportion to the light quantity) are output to the second subtraction circuit 306 respectively. The second subtraction circuit 306 subtracts a signal detected by the fourth detection area 302b from the signal detected by the third detection area 302a. The amplification circuit 307 changes the level of the differential signal of the second subtraction circuit 306 to a level with which the error component, generated by the shift, can be appropriately removed from the differential signal of the first subtraction circuit 303. The gain of the amplification circuit 307 can be less than 1.

The third subtraction circuit 308 subtracts the error component signal from the differential signal 304. The third subtraction circuit 308 outputs a signal generated by subtracting the error component signal from the differential signal 304 as the tilt error signal 23. If the tilt error signal 23 is used, the parallelism between the surface of the optical disk 1 and the emitting surface of the SIL 13 upon the tilt control can be further improved even if the optical disk 1 is decentered.

As described above, according to the first embodiment, a part of the return light spot is detected, and the fluctuation component generated in the tilt error signal is removed based on this detection result. Therefore even if the gap servo is operated with a small gap between the optical disk 1 and the SIL 13, the tilt servo can be accurately operated, which is a special effect. Examples of the first embodiment will be described later.

According to the first embodiment, the shift of the return light spot is dynamically detected, therefore even if the tilt fluctuates while the optical disk 1 rotates once, the error component can be removed following up with the fluctuation of the tilt, which is an advantage.

Figure 7:
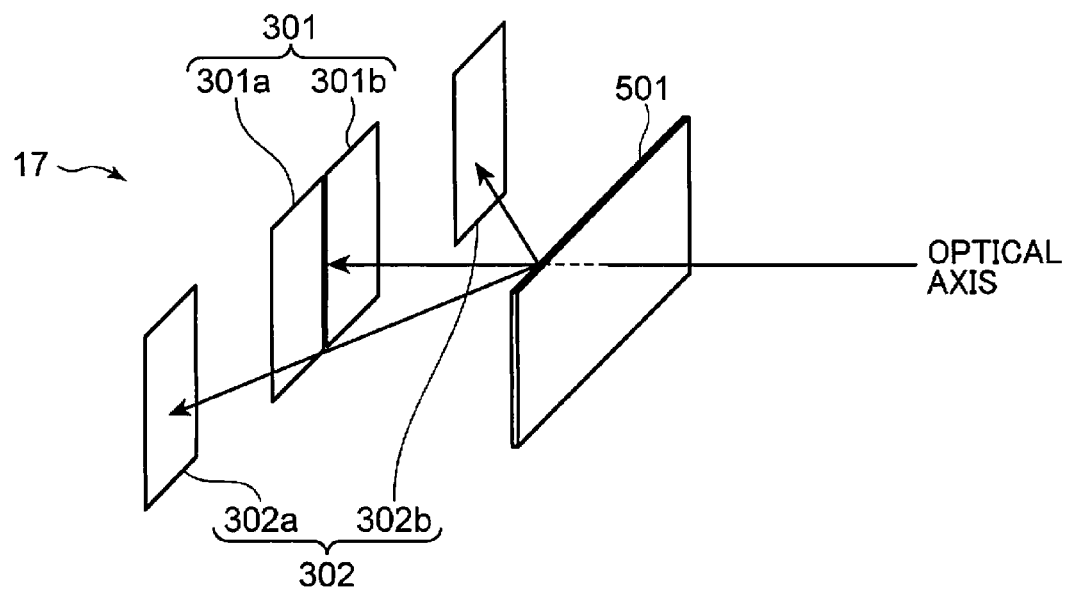
FIG. 7 is a diagram depicting a configuration of the first detector according to a first modification of the first embodiment of the present invention.
Figure 8:
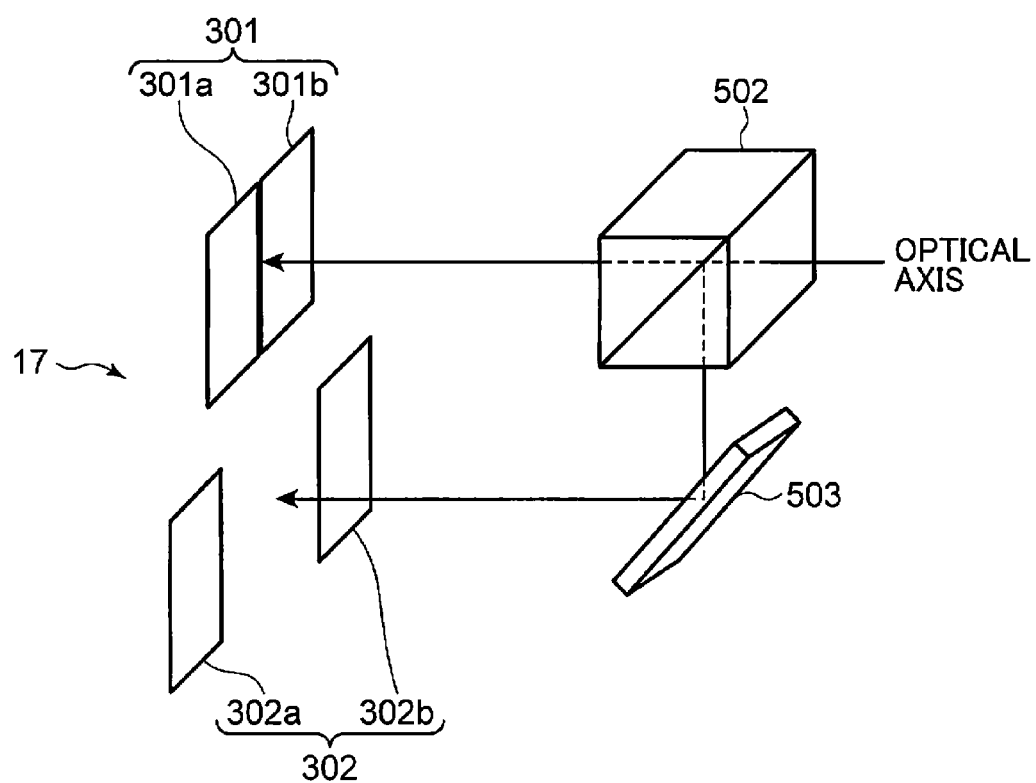
FIG. 8 is a diagram depicting a configuration of the first detector according to a second modification of the first embodiment of the present invention.
Figure 9:
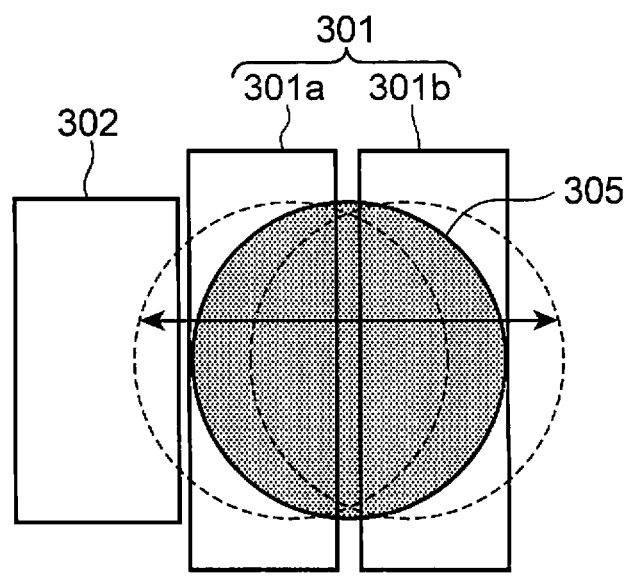
FIG. 9 is a diagram depicting a configuration of the first detector according to a third modification of the first embodiment of the present invention.

According to the first embodiment, the second photodiode 302 is disposed outside the first photodiode 301, but may be disposed in another location only if the shift of the return light spot 305 generated due to decentering of the optical disk 1 can be detected. FIG. 7 is a diagram depicting a configuration of the first detector according to a first modification of the first embodiment of the present invention. FIG. 8 is a diagram depicting a configuration of the first detector according to a second modification of the first embodiment of the present invention, and FIG. 9 is a diagram depicting a configuration of the first detector according to a third modification of the first embodiment of the present invention.

For example, as FIG. 7 depicts, a diffraction optical element 501 may be disposed in front of the first detector 17, and the second photodiode 302 may be disposed in a position distant from the first photodiode 301. The diffraction optical element 501 diffracts the return light. The return light transmitted through the diffraction optical element 501 enters the first photodiode 301 and the second photodiode 302.

A half mirror 502 may be disposed in front of the first detector 17, as depicted in FIG. 8, so that the optical path is split and the light split by the half mirror 502 is reflected by a mirror 503, and the second photodiode 302 may be disposed independently.

A number of second photodiodes 302 need not always be two. As illustrated in FIG. 9, the second photodiode 302 may detect only a shift of the return light spot 305 in one side. In other words, the second photodiode 302 may have only one of the third detection area 302*a* and the fourth detection area 302*b*. The shift of the return light spot 305 generated due to decentering of the optical disk 1 is generated symmetrically at every half rotation. Therefore the second photodiode 302 detects the shift amount generated during a half rotation, and stores the detected shift amount in the system control circuit 20. The system control circuit 20 reverses the polarity of the stored shift amount, and sends the shift amount with the reversed polarity to the third subtraction circuit 308 as the shift amount generated during the other half rotation.

The location of the second photodiode 302 is not limited to the above mentioned configuration. The second photodiode 302 is only required to be disposed in a location where the light quantity detected by the second photodiode 302 changes in response to decentering of the optical disk 1 when the return light fluctuates due to decentering of the optical disk 1.

As described above, the optical information reproduction device or the optical information recording device of the first embodiment comprises: a light source 101 that emits a laser beam; a condensing unit 102 that generates a near-field light and condenses the laser beam on an optical disk 1; a rotating unit 103 that rotates the optical disk 1; a light quantity detection unit 104 that detects light quantity of return light from an area where the near-field light is generated; a gap control unit 105 that controls a gap between the condensing unit 102 and the optical disk 1 based on the light quantity of the return light detected by the light quantity detection unit 104; a tilt calculation unit 106 that calculates, in a state of the gap control unit 105 controlling the gap, an inclination amount between the condensing unit 102 and the optical disk 1 based on the light quantity of the return light detected by the light quantity detection unit 104; a tilt error signal generation unit 107 that generates a tilt error signal, which is a signal without a fluctuation component of the return light generated due to decentering of the optical disk 1, from the inclination amount calculated by the tilt calculation unit 106; and a tilt control unit 108 that controls the inclination between the condensing unit 102 and the optical disk 1 based on the tilt error signal generated by the tilt error signal generation unit 107.

The optical information reproduction method or the optical information recording method of the first embodiment comprises: an emission step of emitting a laser beam; a condensing step of generating a near-field light and condensing the laser beam on an optical disk 1 by the condensing unit 102; a rotation step of rotating the optical disk 1; a light quantity detection step of detecting light quantity of return light from an area where the near-field light is generated; a gap control step of controlling a gap between the condensing unit 102 and the optical disk 1 based on the light quantity of the return light detected in the light quantity detection step; a tilt calculation step of calculating, in a state of controlling the gap in the gap control step, an inclination amount between the condensing unit 102 and the optical disk 1 based on the light quantity detected in the light quantity detection step; a tilt error signal generation step of generating a tilt error signal, which is a signal without a fluctuation component of the return light generated due to decentering of the optical disk 1, from the inclination amount calculated in the tilt calculation step; and a tilt control step of controlling the inclination between the condensing unit 102 and the optical disk 1 based on the tilt error signal generated in the tilt error signal generation step.

According to the device or the method of the first embodiment, the shift of the spot on the detector generated due to decentering of the optical disk 1 can be cancelled regardless the intensity of the return light spot in the annular area. In other words, even if the gap servo is operated with a small gap between the condensing unit 102 and the optical disk 1, the tilt servo can be accurately operated. Thereby information recorded on the optical disk 1 at high density can be stably reproduced with high quality. Information can also be stably recorded on the optical disk 1 with high quality and at high density.

In the optical information reproduction device or the optical information recording device of the first embodiment, the condensing unit 102 may include an SIL 13 that has an emitting surface facing the surface of the optical disk 1. The area where the near-field light is generated in this case is an area near the emitting surface of the SIL 13, for example.

In the optical information reproduction device or the optical information recording device of the first embodiment, the light quantity detection unit 104 may include a light quantity detection unit for decentering detection (e.g. second photodiode 302) that detects a light quantity of a part of the return light, in order to detect the fluctuation component of the return light generated due to decentering of the optical disk 1. The second photodiode 302 is located in a position where the light quantity of a part of the return light to be detected changes in response to the fluctuation of the return light generated due to decentering of the optical disk 1. In this case, the tilt error signal generation unit 107 generates the tilt error signal based on the inclination amount and the light quantity of a part of the return light detected by the second photodiode 302.

According to this configuration, a light quantity of a part of the return light is detected, and the fluctuation component generated in the tilt error signal is removed based on the detection result. As a result, the tilt servo can be accurately operated even if the gap servo is operated with a small gap between the condensing unit 102 and the optical disk 1.

In the optical information reproduction device or the optical information recording device of the first embodiment, the light quantity detection unit for decentering detection (e.g. second photodiode 302) may be located in a position where the part of the return light is not detected if the fluctuation of the return light generated due to decentering of the optical disk 1 does not exist.

According to this configuration, it can be determined that all the light quantity detected by the second photodiode 302 is generated by the fluctuation of the return light due to decentering of the optical disk 1. Therefore light quantity in response to the fluctuation of the return light generated due to decentering of the optical disk 1 can be detected with even higher accuracy.

In the optical information reproduction device or the optical information recording device of the first embodiment, the light quantity detection unit 104 includes a first photodiode 301 (light quantity detection unit for inclination amount detection) that detects the light quantity of the return light, in order to calculate the inclination amount between the condensing unit 102 and the optical disk 1, and a second photodiode 302 (light quantity detection unit for decentering detection) that detects the light quantity of a part of the return light, in order to detect the fluctuation component of the return light generated due to decentering of the optical disk 1. The first photodiode 301 includes a first detection area 301a and a second detection area 301b that are disposed adjacent to each other in a direction where the return light spot is shifted by the fluctuation of the return light generated due to decentering of the optical disk 1. The second photodiode 302 includes a third detection area 302a that is disposed adjacent to the first detection area 301 a in the direction where the return light spot is shifted by the fluctuation of the return light generated due to decentering of the optical disk 1, and a fourth detection area 302b that is disposed adjacent to the second detection area 301b in the direction where the return light spot is shifted by the fluctuation of the return light generated due to decentering of the optical disk 1.

In the optical information reproduction device or the optical information recording device of the first embodiment, the second photodiode 302 may be disposed in a position where a part of the return light is detected, even if the fluctuation of the return light generated due to decentering of the optical disk 1 does not exist. As mentioned above, the second photodiode 302 is only required to be disposed in a location where the detected light quantity changes in response to the fluctuation of the return light if the fluctuation of the return light generated due to decentering of the optical disk 1 exists.

Second Embodiment

A configuration of an optical information reproduction device according to a second embodiment will now be described with reference to FIG. 10.

Figure 10:
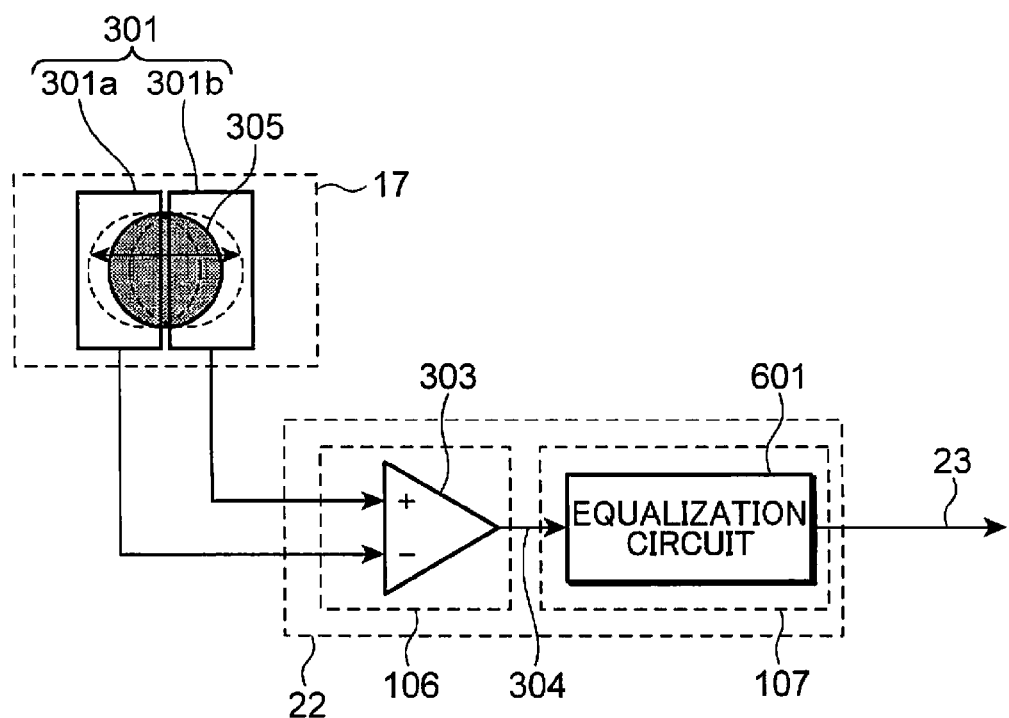
FIG. 10 is a diagram depicting a configuration of a first detector and a tilt calculation circuit according to a second embodiment of the present invention.

FIG. 10 is a diagram depicting a first detector and the tilt calculation circuit according to the second embodiment of the present invention. In the second embodiment, description on the configuration other than the first detector 17 and the tilt calculation circuit 22, which is the same as that of the optical information reproduction device of the first embodiment, is omitted. Differences from the first embodiment are: the first detector 17 does not have the second photodiode 302 (that is, light quantity detection unit for decentering detection); the tilt calculation circuit 22 has an equalization circuit 601 (that is, equalization unit) instead of the second subtraction circuit 306, the amplification circuit 307 and the third subtraction circuit 308; and the size of the first photodiode 301 is large enough for the entire return light spot to enter even if the return spot is shifted. In the second embodiment, the first subtraction circuit 303 and the equalization circuit 601 constitute the tilt calculation circuit 22 (that is, tilt calculation unit 106).

The equalization circuit 601 generates a tilt error signal without the fluctuation component of the return light generated due to decentering of the optical disk 1 by equalizing the changes of the inclination amount calculated by the first subtraction circuit 303 (tilt calculation unit 106).

The first detector 17 is divided into a first detection area 301a and a second detection area 301b. The first detection area 301a and the second detection area 301b are located in positions where a surface area of the spot of light received by the first detection area 301a and a surface area of the spot of light received by the second detection are 301b are the same if the fluctuation of the return light generated due to decentering of the optical disk 1 does not exist and a spot is not shifted, and a surface area of the spot of light received by the first detection area 301a and a surface area of the spot of light received by the second detection area 301b change in response to the fluctuation of the return light if the fluctuation of the return light generated due to decentering of the optical disk 1 exists and the spot is shifted.

The first detector 17 is divided into the first detection area 301 a and the second detection area 301b along a line that passes through a center point of the return light spot in the case when the fluctuation of the return light generated due to decentering of the optical disk 1 does not exist, and is perpendicular to the direction where the return light spot is shifted by fluctuation of the return light generated due to decentering of the optical disk 1.

The first detector 17 outputs a first signal in response to the light quantity of the spot of light received by the first detection area 301a, and outputs a second signal in response to the light quantity of the spot of light received by the second detection area 301b. The first subtraction circuit 303 (tilt calculation unit 106) outputs a differential signal 304 between the first signal and the second signal as the inclination amount.

The equalization circuit 601 generates the tilt error signal 23 by equalizing the differential signal 304. The equalization circuit 601 delimits the equalization time by an integral multiple of time for the optical disk 1 to rotate once.

The operation of the optical information reproduction device of the second embodiment is as follows. The light quantity of the return light that entered each photodiode (first detection area 301a and second detection area 301b) is detected by the first photodiode 301, an electric signal corresponding to the detected light quantity is input to the first subtraction circuit 303, and a differential signal 304 is obtained, which is the same as a conventional optical information reproduction device.

A difference from the conventional optical information reproduction device is as follows. The first subtraction circuit 303 outputs a differential signal 304, which indicates a difference between a signal detected by the first detection area 301a and a signal detected by the second detection area 301b, to the equalization circuit 601. The differential signal 304 is input to the equalization circuit 601. The equalization circuit 601 equalizes the differential signal 304 using a time when the optical disk 1 rotates at least once. The equalization circuit 601 may be an electric circuit, such as a high-pass filter, or may be a program which numerically equalizes a digitized signal, or may be a semiconductor circuit with such a program embedded.

Figure 11A:
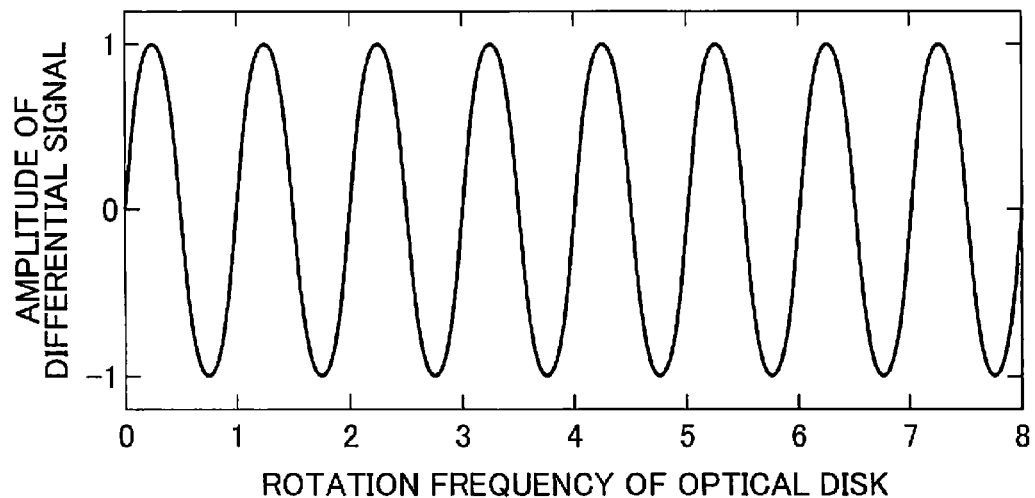
FIG. 11A is a diagram depicting a change of amplitude of a differential signal.

Now the operation of the optical information reproduction device of the second embodiment will be further described with reference to FIG. 10 and FIG. 11. FIG. 11A is a diagram depicting a change of amplitude of the differential signal, and FIG. 11B is a diagram depicting a change of amplitude of an output signal from the equalization circuit.

It is assumed that the inclination between the emitting surface of the SIL 13 and the surface of the optical disk 1 is zero. In this state, the decentered optical disk 1 is rotated after the gap servo is operated, and a still state is generated by operating the focus servo and the tracking servo. In this case, the return light spot 305 is shifted on the first photodiode 301. As the optical disk 1 rotates, the shift amount of the return light spot 305 changes, and when the optical disk 1 rotates once, the return light spot 305 returns to the same position, and the shift amount becomes the same as the original state. This is because the difference between a radius position of the track when decentering does not exist and a radius position of the track when decentering exists depends on the rotation angle of the optical disk 1. In other words, the shift amount fluctuates synchronizing with a cycle of one rotation of the optical disk 1. Therefore as FIG. 11A shows, the amplitude of the differential signal 304 fluctuates synchronizing with a cycle of one rotation of the optical disk 1. In FIG. 11A, the amplitude of the differential signal 304 has been normalized to 1.

The equalization circuit 601 equalizes the amplitude of the differential signal 304. It is preferable to perform equalization while spending sufficiently longer time than the time for the optical disk 1 to rotate once. This is because a time less than one rotation can be short enough to be ignored, as the time spent for equalization becomes longer. An advantage in this case is that the equalization circuit 601 need not use a rotation synchronization signal, and the equalization circuit 601 can be simplified.

Figure 11B:
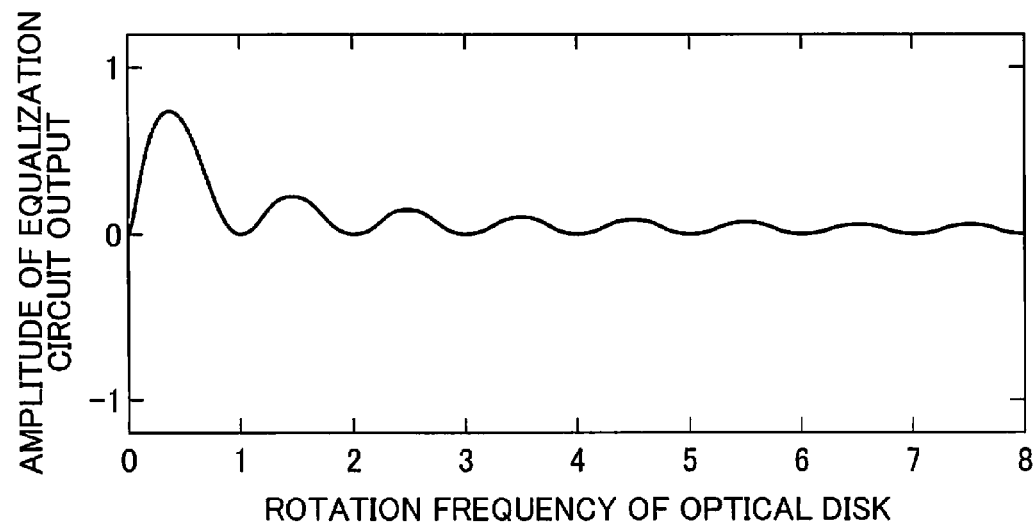
FIG. 11B is a diagram depicting a change of amplitude of an output signal from an equalization circuit.

The output from the equalization circuit 601 has the waveform shown in FIG. 11B. As depicted in FIG. 11B, as the rotation frequency of the optical disk 1 increases (that is as time elapses), output from the equalization circuit 601 decreases. When the inclination between the emitting surface of the SIL 13 and the surface of the optical disk 1 finally becomes zero, the amplitude converges to zero regardless the shift of the return light spot 305. The signal from the equalization circuit 601 is used as the tilt error signal 23. In other words, the error component generated by the shift of the return light spot 305 can be removed based on the tilt error signal 23.

As described above, according to the second embodiment, the differential signals obtained from the divided photodiodes are equalized. Therefore even if the gap servo is operated with a small gap between the optical disk 1 and the SIL 13, the tilt servo can be accurately operated, which is a special effect.

An advantage unique to the second embodiment is that a detector for detecting a shift amount need not be installed independently, hence the tilt servo can be accurately operated with a simple optical system configuration.

In order to equalize in a shorter time, it is preferable to delimit the equalization time with an integrated multiple of time for the optical disk 1 to rotate once, since equalization can be accurately performed. A rotation synchronization signal outputted from the spindle motor 28 can be used to detect the rotation of the optical disk 1.

As described above, the optical information reproduction device or the optical information recording device of the second embodiment comprises: a light source 101 that emits a laser beam; a condensing unit 102 that generates a near-field light and condenses the laser beam on the optical disk 1; a rotating unit 103 that rotates the optical disk 1; a light quantity detection unit 104 that detects light quantity of return light from an area where the near-field light is generated; a gap control unit 105 that controls a gap between the condensing unit 102 and the optical disk 1 based on the light quantity of the return light detected by the light quantity detection unit 104; a tilt calculation unit 106 that calculates, in a state of the gap control unit 105 controlling the gap, an inclination amount between the condensing unit 102 and the optical disk 1 based on the light quantity of the return light detected by the light quantity detection unit 104; a tilt error signal generation unit 107 that generates a tilt error signal, which is a signal without a fluctuation component of the return light generated due to decentering of the optical disk 1, from the inclination amount calculated by the tilt calculation unit 106; and a tilt control unit 108 that controls the inclination between the condensing unit 102 and the optical disk 1 based on the tilt error signal generated by the tilt error signal generation unit 107.

In the optical information reproduction device or the optical information recording device of the second embodiment, the condensing unit 102 may include an SIL 13 that has an emitting surface facing the surface eof the optical disk 1. The area where the near-field light is generated in this case is an area near the emitting surface of the SIL 13, for example.

In the optical information reproduction device or the optical information recording device of the second embodiment, the tilt error signal generation unit 107 includes an equalization circuit 601 (equalization unit) that generates the tilt error signal without the fluctuation component of the return light generated due to decentering of the optical disk 1, by equalizing the change of the inclination amount calculated by the tilt calculation unit 106.

In this case, the light quantity detection unit 104 may include a first photodiode 301 (light quantity detection area) that receives the return light spot. In this case, the first photodiode 301 may be divided into a first detection area 301a (e.g. one of the areas of the first photodiode 301) and a second detection area 301b (e.g. the other area of the first photodiode 301).

The first detection area 301a and the second detection area 301b may be located in positions where a surface area of the spot of light received by the first detection area 301a and a surface area of the spot of light received by the second detection area 301b are the same if the fluctuation of the return light spot generated due to decentering of the optical disk 1 does not exist and the spot is not shifted. The first detection area 301a and the second detection area 301b may be located in positions where a surface area of the spot of light received by the first detection area 301a and a surface area of the spot of light received by the second detection area 301b change in response to the fluctuation if the fluctuation of the return light spot generated due to decentering of the optical disk 1 exists and the spot is shifted.

The light quantity detection unit 104 may output a first signal in response to the light quantity of the spot of light received by the first detection area 301a, and output a second signal in response to the light quantity of the spot of light received by the second detection area 301b. The tilt calculation unit 106 may output a differential signal, which indicates a difference between the first signal and the second signal, as the inclination amount.

In this case, the equalization circuit 601 may generate the tilt error signal by equalizing the differential signal.

According to this configuration, the differential signals obtained from the divided detectors are equalized. As a result, the tilt servo can be accurately operated even if the gap servo is operated with a small gap between the condensing unit 102 and the optical disk 1. Furthermore a detector for detecting the shift amount need not be installed independently. Therefore the tilt servo can be accurately operated with a simple optical system configuration.

In the optical information reproduction device or the optical information recording device of the second embodiment, the equalization circuit 601 may delimit the equalization time by an integral multiple of time for the optical disk 1 to rotate once.

According to this configuration, equalization can be accurately performed even if equalization in a short time is required.

In the optical information reproduction device or the optical information recording device of the second embodiment, the first photodiode 301 (light quantity detection area) may be divided into the first detection area 301a and the second detection area 301b along a line that passes through a center point of the return light spot in the case when the fluctuation of the return light generated due to decentering of the optical disk 1 does not exist, and is perpendicular to the direction where the return light spot is shifted by fluctuation of the return light generated due to decentering of the optical disk 1.

Third Embodiment

A configuration of an optical information reproduction device according to a third embodiment will now be described with reference to FIG. 12 and FIG. 13.

Figure 12:
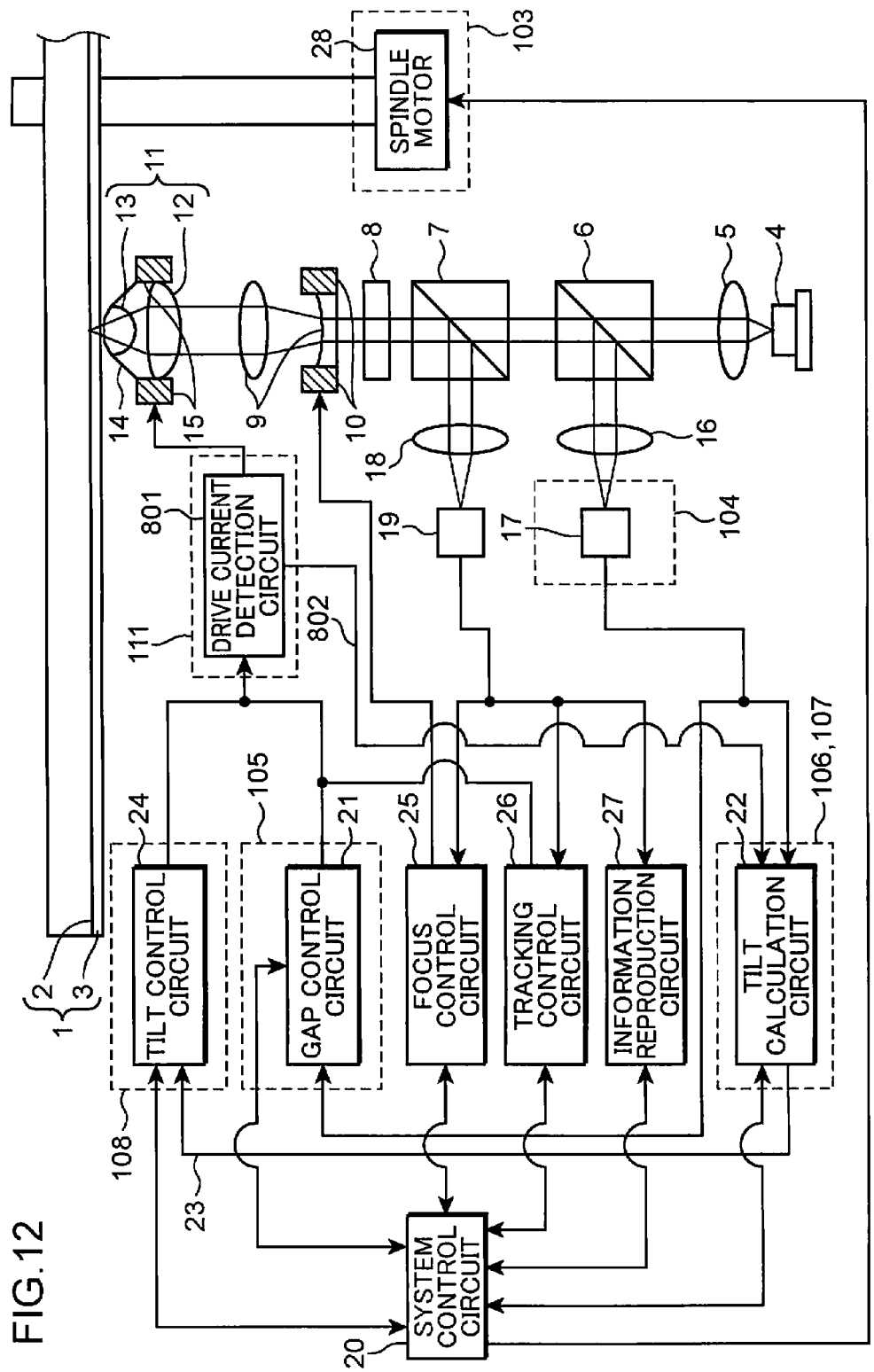
FIG. 12 is a diagram depicting a general configuration of the optical information reproduction device according to the third embodiment of the present invention.

FIG. 12 is a diagram depicting a general configuration of the optical information reproduction device according to the third embodiment. In the third embodiment, a composing element the same as the optical information reproduction devices of the first embodiment and the second embodiment are denoted with a same reference symbol, for which description is omitted. Differences of the optical information reproduction device of the third embodiment from the optical information reproduction device of the first embodiment is that a drive current detection circuit 801 (that is, drive current detection unit 111) that detects drive current to be output to the actuator 15 is included, and that the tilt calculation circuit 22 uses a drive signal 802 that indicates a change of the drive current, as a signal for removing an error component generated due to decentering.

The drive current detection circuit 801 detects drive current outputted by the tracking control circuit 26. The tracking control circuit 26 changes the drive current in response to the fluctuation of the return light due to decentering of the optical disk 1. The tilt calculation circuit 22 generates a tilt error signal based on the calculated inclination amount and the result of detecting the drive current by the drive current detection circuit 801.

Figure 13:
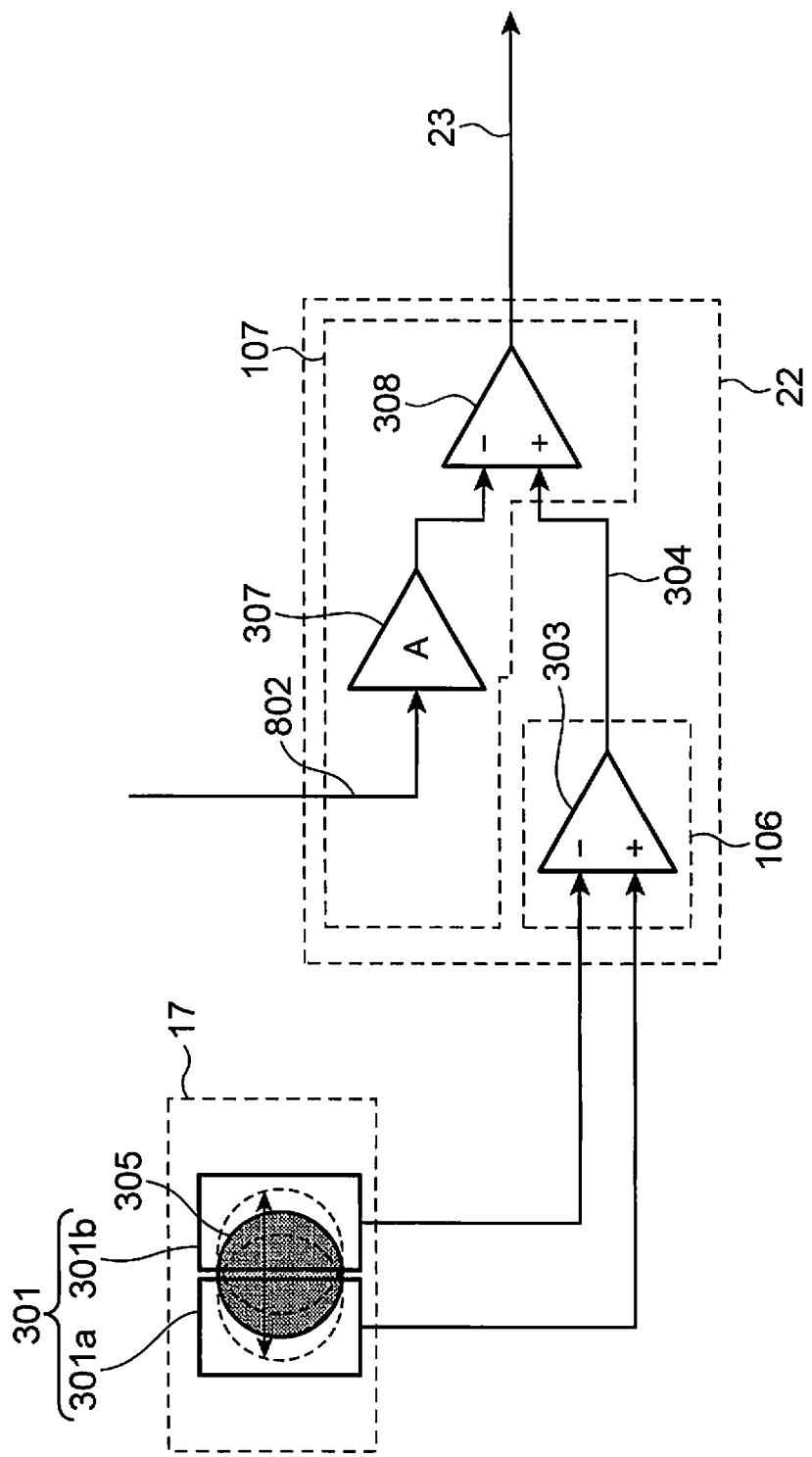
FIG. 13 is a diagram depicting a configuration of a first detector and a tilt calculation circuit according to the third embodiment of the present invention.

FIG. 13 is a diagram depicting a configuration of the first detector and the tilt calculation circuit according to the third embodiment of the present invention. Differences from the first embodiment are that the first detector 17 does not have the second photodiode 302 (that is, light quantity detection unit for decentering detection), that a drive signal 802 is used instead of the output signal from the second photodiode 302, and that similarly to the second embodiment the size of the first photodiode 301 is large enough for the entire return light spot to enter even if the return spot is shifted.

Figure 14A:
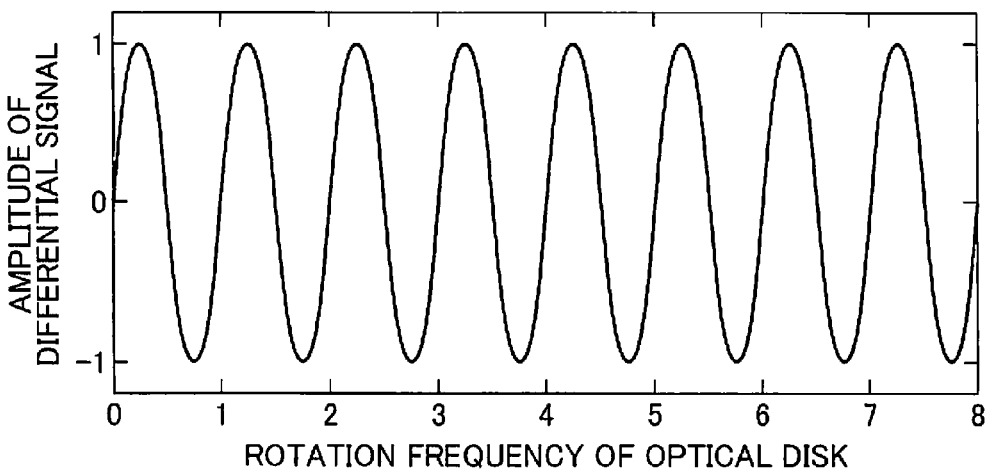
FIG. 14A is a diagram depicting a change of amplitude of a differential signal.
Figure 14B:
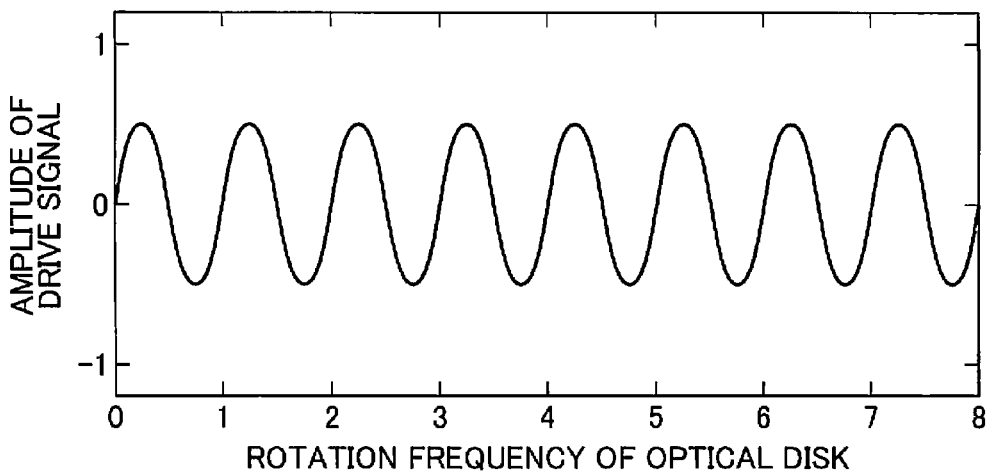
FIG. 14B is a diagram depicting a change of amplitude of a drive signal from a drive current detection circuit.
Figure 14C:
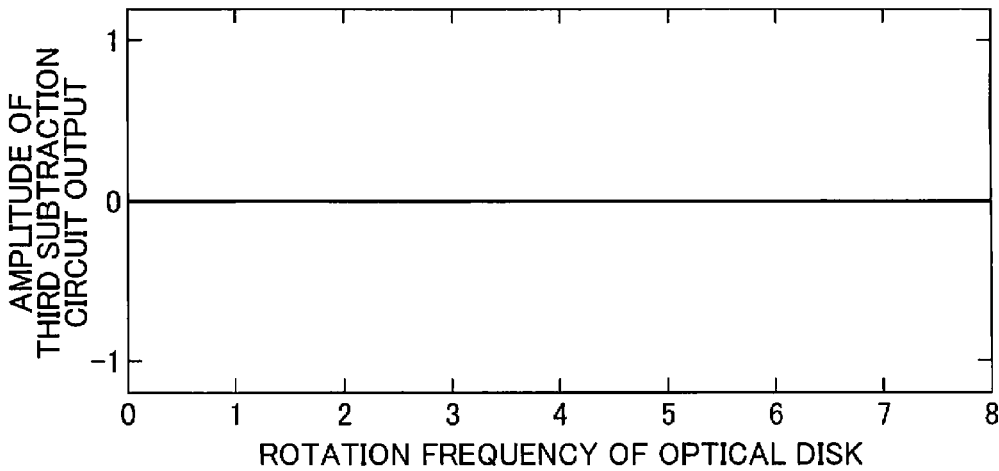
FIG. 14C is a diagram depicting a change of amplitude of an output signal from a third subtraction circuit.

Now the operation of the optical information reproduction device of the third embodiment will be described with reference to FIG. 13 and FIG. 14A to FIG. 14C. FIG. 14A is a diagram depicting a change of amplitude of a differential signal, FIG. 14B is a diagram depicting a change of amplitude of a drive signal from the drive current detection circuit, and FIG. 14C is a diagram depicting a change of amplitude of an output signal from the third subtraction circuit.

Just like the second embodiment, it is assumed that the inclination between the emitting surface of the SIL 13 and the surface of the optical disk 1 is zero. In this state, the decentered optical disk 1 is rotated, and the tracking servo is operated just like the example of the first embodiment, so as to generate the still state. In this case, the amplitude of the differential signal 304 fluctuates synchronizing with a cycle of one rotation of the optical disk 1, as shown in FIG. 14A.

The tracking control circuit 26, on the other hand, outputs the drive current to the actuator 15, and shifts the position of the condensing unit 11 in the radius direction in order to follow up the decentering of the optical disk 1. As the optical disk 1 rotates, the shift amount of the condensing unit 11 in the radius direction changes, and when the optical disk 1 rotates once, the return light spot 305 returns to the same position and the shift amount becomes the same as the original state. This is because the difference between a radius position of the track when decentering does not exist and a radius position of the track when decentering exists depends on the rotation angle of the optical disk 1, just like the case of the second embodiment. In other words, the shift amount fluctuates synchronizing with a cycle of one rotation of the optical disk 1.

The drive current detection circuit 801 converts the change of the drive current into a voltage value or a digital value, and outputs the value as the drive signal 802. Therefore as FIG. 14B shows, the amplitude of the drive signal 802 also fluctuates synchronizing with a cycle of one rotation of the optical disk 1.

The drive current detection circuit 801 outputs the drive signal 802 to the amplification circuit 307. The drive signal 802 is sent to the amplification circuit 307. The amplification circuit 307 changes the level of the drive signal 802 to a level with which an error component generated by the shift of the return light spot 305 can be appropriately removed. For example, if the amplitude of the differential signal 304 is 1 (arbitrary unit), and the amplitude of the drive signal is 0.5 (arbitrary unit), then the gain of the amplification circuit 307 is set to 2. The gain of the amplification circuit 307 can be less than 1.

The third substraction circuit 308 subtracts the output signal of the amplification circuit 307 from the differential signal 304. The third subtraction circuit 308 outputs a signal generated by subtracting the output signal of the amplification circuit 307 from the differential signal 304, as a tilt error signal 23. The output from the third subtraction circuit (that is, the tilt error signal 23) does not have the error component generated by decentering, as shown in FIG. 14C.

As described above, according to the third embodiment, the drive current to the actuator 15 for shifting the condensing unit 11 in the radius direction is detected, and the fluctuation component generated in the tilt error signal is removed based on the drive current detection result, therefore even if the gap servo is operated with a small gap between the optical disk 1 and the SIL 13, the tilt servo can be accurately operated, which is a special effect.

An advantage unique to the third embodiment is that a detector for detecting a shift amount need not be installed independently, hence the tilt servo can be accurately operated with a simple optical system configuration. Furthermore, even if the inclination amount between the optical disk 1 and the SIL 13 fluctuates while the optical disk 1 rotates once, the error component can be removed from the inclination amount with following up the fluctuation of the inclination amount.

As described above, the optical information reproduction device or the optical information recording device of the third embodiment comprises: a light source 101 that emits a laser beam; a condensing unit 102 that generates a near-field light and condenses the laser beam on the optical disk 1; a rotating unit 103 that rotates the optical disk 1; a light quantity detection unit 104 that detects light quantity of return light from an area where the near-field light is generated; a gap control unit 105 that controls a gap between the condensing unit 102 and the optical disk 1 based on the light quantity of the return light detected by the light quantity detection unit 104; a tilt calculation unit 106 that calculates, in a state of the gap control unit 105 controlling the gap, an inclination amount between the condensing unit 102 and the optical disk 1 based on the light quantity of the return light detected by the light quantity detection unit 104; a tilt error signal generation unit 107 that generates a tilt error signal, which is a signal without a fluctuation component of the return light generated due to decentering of the optical disk 1, from the inclination amount calculated by the tilt calculation unit 106; and a tilt control unit 108 that controls the inclination between the condensing unit 102 and the optical disk 1 based on the tilt error signal generated by the tilt error signal generation unit 107.

In the optical information reproduction device or the optical information recording device of the third embodiment, the condensing unit 11 may include an SIL 13 that has an emitting surface facing the surface of the optical disk 1. The area where the near-field light is generated in this case is an area near the emitting surface of the SIL 13, for example.

The optical information reproduction device or the optical information recording device of the third embodiment may further comprise: a tracking controlling circuit 26 (tracking control unit) that outputs drive current for shifting the condensing unit 11 in the radius direction of the optical disk 1; an actuator 15 that adjusts the position of the condensing unit 11 in response to the drive current; and a drive current detection circuit 801 (drive current detection unit) that detects the drive current outputted by the tracking control circuit 26. The tracking control circuit 26 changes the drive current in response to the fluctuation of the return light generated due to decentering of the optical disk 1. At this time, the tilt signal generation unit 107 generates the tilt error signal based on the inclination amount calculated by the tilt calculation unit 106 and the drive current detection result detected by the drive current detection circuit 801.

In this case, the first detector 17 (light quantity detection unit) may includes a first photodiode 301 (light quantity detection area) that receives a return light spot. In this case, the first photodiode 301 may be divided into a first detection area 301a (e.g. one of the areas of the first photodiode 301) and a second detection area 301b (e.g. the other area of the photodiode 301).

The first detection area 301a and the second detection area 301b may be located in positions where a surface area of the spot of light received by the first detection area 301a and a surface area of the spot of light received by the second detection area 301b are the same if the fluctuation of the return light generated due to decentering of the optical disk 1 does not exist and the spot is not shifted. The first detection area 301a and the second detection area 301b may be located in positions where a surface area of the spot of light received by the first detection area 301a and a surface area of the spot of light received by the second detection area 301b change in response to the fluctuation of the return light if the fluctuation of the return light generated due to decentering of the optical disk 1 exists and the spot is shifted.

The first detector 17 may output a first signal in response to the light quantity of the spot of light received by the first detection area 301a, and output a second signal in response to the light quantity of the spot of light received by the second detection area 301b. The tilt calculation unit 106 may output a differential signal, which indicates a difference between the first signal and the second signal, as the inclination amount.

In this case, the tilt signal generation unit 107 may generate the tilt error signal based on the drive current detection result detected by the drive current detection circuit 801 and the differential signal.

According to this configuration, the drive current to shift the condensing unit 11 in the radius direction of the optical disk 1 is detected, and the fluctuation component generated in the tilt error signal is removed based on the drive current detection result. As a result, the tilt servo can be accurately operated even if the gap servo is operated with a small gap between the condensing unit 102 and the optical disk 1. Further, a detector for detecting the shift amount need not be installed independently. Therefore the tilt servo can be accurately operated with a simple optical system configuration. Furthermore, even if the inclination amount between the optical disk 1 and the condensing unit 102 fluctuates while the optical disk 1 rotates once, the error component can be removed from the inclination amount with following up the fluctuation of the inclination amount.

In the optical information reproduction device or the optical information recording device of the third embodiment, the first photodiode 301 may be divided into the first detection area 301a and the second detection area 301b along a line that passes through a center point of the return light spot in the case when the fluctuation of the return light generated due to decentering of the optical disk 1 does not exist, and is perpendicular to the direction where the return light spot is shifted by fluctuation of the return light generated due to decentering of the optical disk 1.

Examples

Examples of the first embodiment will now be described concretely based on the result combining principle confirmation experiments and calculations.

Principle confirmation experiments were conducted using the configuration based on the optical information reproduction device shown in FIG. 2 and FIG. 3. A 1.1 mm thick polycarbonate substrate is used for the substrate of the optical disk 1. For the information layer 2, a spiral type pit string is formed on the substrate as a track, and a 100 nm thick Ag alloy reflection layer is formed thereon. The track pitch is 240 nm and the depth of the pit is 20 nm.

For the cover layer between the information layer 2 and the surface of the optical disk 1, a same material as the intermediate layer is coated by a spin coat method after formed the reflection layer, and is UV-cured for completion. The thickness of the cover layer is 3 μm. An acrylic resin material, to which titania type filler is added, is used for the ultraviolet curable resin. The refractive index after curing is 1.80 with respect to a light of which wavelength is 405 nm.

The refractive indices of the cover layer and the intermediate layer of the optical disk 1 are preferably equal to or greater than the equivalent numerical aperture of the SIL 13, since coupling efficiency to the optical disk 1 can be maximized.

The oscillation wavelength of the laser light source 4 is 405 nm. For the SIL 13, a semi-spherical lens, of which plane side is tapered, is used. The equivalent numerical aperture of the SIL 13 is 1.84.

For the actuator 15, the beam expander 9, the actuator 10, the focus control circuit 25, the tracking control circuit 26, the information reproduction circuit 27 and the system control circuit 20, the same components of an optical disk evaluation machine that uses a far-field light (not a near-field light) are used. The gap control circuit 21, the tilt calculation circuit 22 and the tilt control circuit 24 are fabricated based on the method described in the first embodiment.

Figure 15:
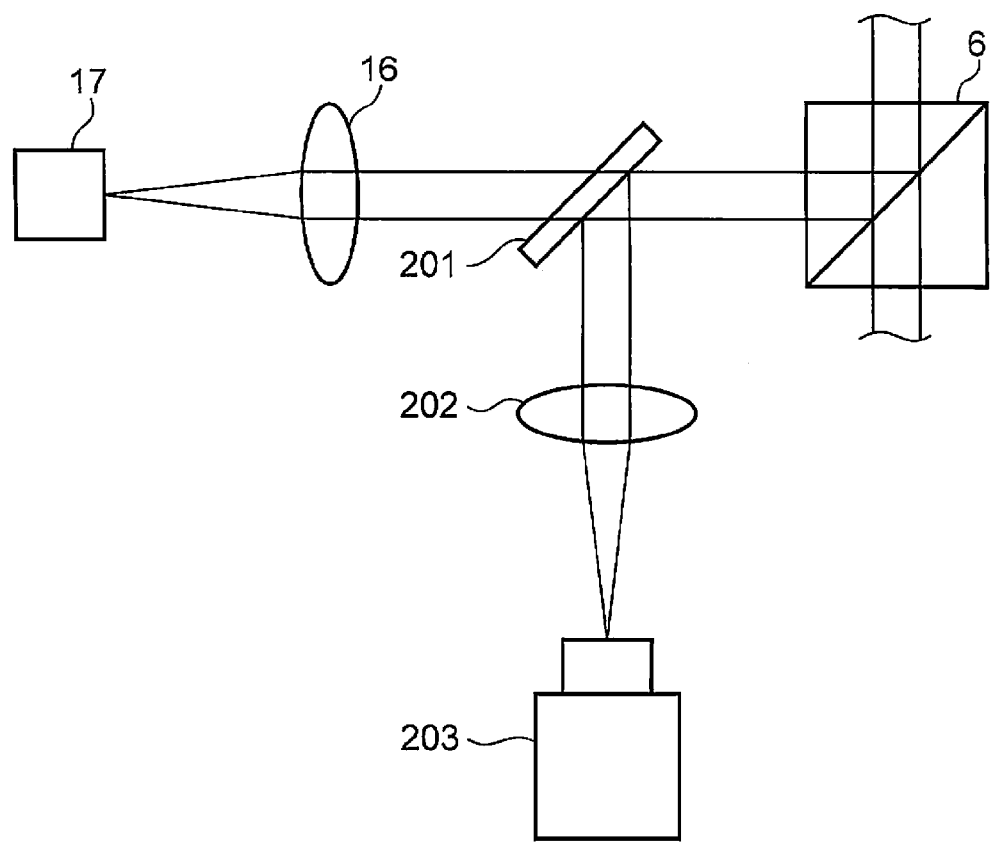
FIG. 15 is a diagram depicting a configuration of a measurement system according to an example of the first embodiment of the present invention.

FIG. 15 is a diagram depicting a configuration of the measurement system according to the first embodiment of the present invention. In order to measure the shift amount of the return light spot 305 shown in FIG. 3, an optical system and a detection system shown in FIG. 15 are disposed between the non-polarization beam splitter 6 and the first detection lens 16 shown in FIG. 2. In the optical system and the detection system, a part of the return path light reflected by the non-polarization beam splitter 6 is diverged by the half mirror 201. The diverged light is converged by the third detection lens 202, and the converged light is received by the CCD camera 203. A spot of the light received by the CCD camera 203 is displayed on the display (not illustrated).

Using the above described configuration, an experiment to reproduce information by condensing the laser beam on the information layer 2 of the optical disk 1 is performed.

First, the optical disk 1 is attached to the shaft of spindle motor 28. Then the decentering amount of the optical disk 1 is determined based on the shift amount of the edge of the optical disk 1 by observing the edge of the optical disk 1 using an optical microscope, while manually rotating the disk. The decentering amount in this case is 50 μm (peak to peak).

In a state where the optical disk 1 stops rotation, the reproduction power is set to 0.8 mW, and the laser power is irradiated onto the optical disk 1. Then the gap servo is operated by the gap control circuit 21. While decreasing the gap between the SIL 13 and the surface of the optical disk 1 from 80 nm to 20 nm, the image of the return light spot is observed using the CCD camera 203. In the case of an 80 nm gap, the annular area (edge area) is brighter than the center area of the return light spot, but the annular area becomes darker as the gap decreases, and the intensity of the annular area becomes approximately the same as the intensity of the center area when the gap is 20 nm.

In the state where the gap is 20 nm, the beam expander 10 is controlled to a position for focusing the laser beam onto the information layer 2. The spindle motor 28 is driven so that the linear velocity of the optical disk 1 is 1.5 m/s, and the optical disk 1 is rotated, then the tracking servo is operated to generate the still state.

As a result of observing an image of the return light spot on the display in this state, the return light spot is shifted synchronizing with the rotation of the optical disk 1 due to decentering of the optical disk 1. The shift amount is 30% of the diameter of the spot (peak to peak).

Based on the above experiment result, the levels of the differential signal 304 and the tilt error signal 23, when the return light spot 305 is shifted on the first detector 17, are estimated by calculation.

Assuming the state when the inclination between the emitting surface of the SIL 13 and the surface of the optical disk 1 is zero, the light quantity distribution of the return light spot is isotropic with respect to the center of the spot. The width of the first photodiode 301 in the shift direction (horizontal direction in FIG. 3) is approximately the same as the diameter of the spot, and the return light enters the second photodiode 302 located outside the first photodiode 301 if the return light spot 305 is shifted. The distance between the photodiodes is negligibly small. The widths of the respective divided photodiodes (first, second, third and fourth detection areas 301a, 301b, 302a, 302b) are all the same.

It is assumed that a direction where the return light spot shifts is the x direction, and a direction that is perpendicular to the x direction is the y direction. If the radius of the return light spot is normalized to 1 and the shift amount of the spot (zero to peak) is s, then the light quantity $I_1$ of the return light that enters one of the detection areas (first detection area 301a in FIG. 3) of the first photodiode 301 is in proportion to the area where the spot is detected in the photodiode. The light quantity $I_1$ is given by the following Expression (1).

[Expression 1]

$$I_1 = 2\int_{-1}^{0}\sqrt{1-(x+s)^2}\,dx \tag{1}$$

In the same manner, the light quantity $I_2$ of the return alight that enters the other detection area (second detection area 301b in FIG. 3) of the first photodiode 301 is given by the following Expression (2).

[Expression 2]

$$I_2 = 2\int_{0}^{1}\sqrt{1-(x+s)^2}\,dx \tag{2}$$

In the same manner, the light quantity $I_3$ of the return light that enters one of the detection areas (third detection area 302a in FIG. 3) of the second photodiode 302 is given by the following Expression (3).

[Expression 3]

$$I_3 = 2\int_{-2}^{-1}\sqrt{1-(x+s)^2}\,dx \tag{3}$$

In the same manner, the light quantity $I_4$ of the return light that enters the other detection area (fourth detection area 302b in FIG. 3) of the second photodiode 302 is given by the following Expression (4).

[Expression 4]

$$I_4 = 2\int_{1}^{2}\sqrt{1-(x+s)^2}\,dx \tag{4}$$

The differential signal (that is, a conventional tilt error signal) $I_p$ is given by the following Expression (5) based on Expressions (1) and (2).

$$I_p = I_1 - I_2 \tag{5}$$

The output signal $I_e$ of the amplification circuit 307 is given by the following Expression (6) based on Expressions (3) and (4).

$$I_e = k(I_3 - I_4) \tag{6}$$

Here k is a gain of the amplification circuit 307, and is set to a value with which an error component generated in the differential signal $I_p$ can be appropriately removed.

Hence the tilt error signal $I_n$ according to this example can be given by the following Expression (7).

$$I_n = I_1 - I_2 - k(I_3 - I_4) \tag{7}$$

Figure 16:
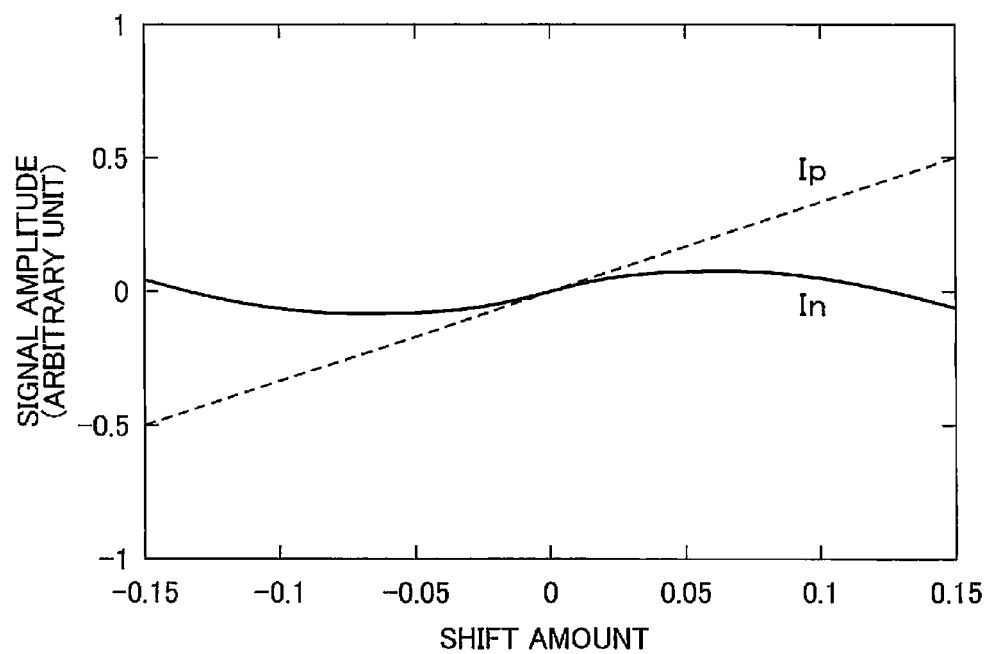
FIG. 16 is a diagram depicting a relationship between a shift amount of the spot and a differential signal, and a relationship between a shift amount of the spot and a tilt error signal.

FIG. 16 is a graph in which the gain k is set to "5", and the differential signal $I_p$ (corresponds to the conventional tilt error signal) and the tilt error signal $I_n$ are plotted with respect to the shift amount s. FIG. 16 shows a relationship between the shift amount s of the spot and the differential signal $I_p$, and the relationship between the shift amount s of the spot and the tilt error signal $I_n$.

Even if the inclination is zero, the level of the conventional tilt error signal (differential signal $I_p$) increases as the return light spot shifts, and this level reaches 0.491 (arbitrary unit) if the return light spot shifts 15% of the diameter. Whereas the level of the tilt error signal $I_n$ of this example can remain at a maximum 0.075 (arbitrary unit) when the shift amount of the return light spot is within ±15% of the diameter. In other words, the error component generated by the shift of the return spot can be dramatically decreased.

The diagrams depicting the configurations of the first to third embodiments of the present invention illustrate only the configurations required for describing each embodiment and example, and in an actual device, means and circuits are added if necessary. For example, in the case of a device that can record information (optical information recording device), a modulation circuit that modulates information, a recording pulse generation circuit that generates a recording pulse, a laser drive circuit that modulates the intensity of the laser beam, among other components, are added.

In the first to third embodiments of the present invention, the effect on tilt control was described, but the present invention can be applied just the same to another servo control based on the detection by the divided detectors using return light.

In the first to third embodiments of the present invention, an optical disk having a single layer was used for description, but the present invention can also be applied to an optical disk having two or more arbitrary number of (nth layer of) information layers.

In the first to third embodiments, the output from the first detector 17 is shared for the gap control and the tilt control, but outputs from dedicated detectors may be used respectively. However if one detector is used for both the gap control and the tilt control, configuration of the device can be more simplified, and manufacturing cost of the device can therefore be decreased.

The conditions of the optical system, recording conditions and reproduction conditions used for the first to third embodiments are not limited to those mentioned above, but appropriate conditions can be set according to the characteristics of the device or the optical disk.

In the first to third embodiments, a phase change material is used as a recording material of a recordable or erasable optical disk, but the present invention is not limited to this, but can be applied to any optical disk made of a dye material or magneto-optical material on which recording marks can be formed using a near-field light.

In the description of the first to third embodiments, pits or marks are recorded in the information layer of the optical information recording medium using a light converged by the SIL as an example. Also in the description of the above embodiments, information recorded as pits and marks in the information layer are reproduced using a reflected light of the light converged by the SIL, that is reflected by the information layer. However the configuration of the present invention is not limited to these configurations. For example, the information can be recorded or reproduced on/from the optical information recording medium using a plasmon light generated by plasmon resonance. In this case as well, the gap control and the tilt control can be performed using the SIL, just like the first to third embodiments. In this case, a light source for light guided to the SIL may be installed in addition to the light source for a light used for generating the plasmon light. The light used for generating the plasmon light and the light guided to the SIL may be emitted from a same light source.

In the first to third embodiments, SIL is used as a means for generating the near-field light, but the near-field light may be generated using other means, such as an optical waveguide.

The above mentioned effects can also be implemented for a personal computer, server, recorder or semiconductor device using the above mentioned optical information reproduction method and optical information reproduction device.

The above mentioned embodiments primarily include the invention having the following configuration.

An optical information reproduction device according to an aspect of the present invention is an optical information reproduction device for reproducing information from an optical information recording medium, comprising: a light source that emits a laser beam; a condensing unit that generates a near-field light and condenses the laser beam on the optical information recording medium; a rotation unit that rotates the optical information recording medium; a light quantity detection unit that detects light quantity of return light from an area where the near-field light is generated; a gap control unit that controls a gap between the condensing unit and the optical information recording medium based on the light quantity of the return light detected by the light quantity detection unit; a tilt calculation unit that calculates, in a state where the gap is controlled by the gap control unit, an inclination amount between the condensing unit and the optical information recording medium based on the light quantity of the return light detected by the light quantity detection unit; a tilt error signal generation unit that generates from the inclination amount calculated by the tilt calculation unit a tilt error signal, which is a signal from which a fluctuation component of the return light generated due to decentering of the optical information recording medium is removed; and a tilt control unit that controls the inclination between the condensing unit and the optical information recording medium based on the tilt error signal generated by the tilt error signal generation unit.

According to this configuration, the light source emits a laser beam, and the condensing unit generates a near-field light and condenses the laser beam on the optical information recording medium. The rotation unit rotates the optical information recording medium. The light quantity detection unit detects light quantity of return light from an area where the near-field light is generated. The gap control unit controls a gap between the condensing unit and the optical information recording medium based on the light quantity of the return light detected by the light quantity detection unit. The tilt calculation unit calculates, in a state of the gap control unit controlling the gap, an inclination amount between the condensing unit and the optical information recording medium based on the light quantity of the return light detected by the light quantity detection unit. The tilt error signal generation unit generates a tilt error signal, which is a signal without a fluctuation component of the return light generated due to decentering of the optical information recording medium, from the inclination amount calculated by the tilt calculation unit. The tilt control unit controls the inclination between the condensing unit and the optical information recording medium based on the tilt error signal generated by the tilt error signal generation unit.

Therefore an inclination amount between the condensing unit and the optical information recording medium is calculated based on the light quantity of the return light, in a state of controlling the gap, and the tilt error signal, which is a signal without a fluctuation component of the return light generated due to decentering of the optical information recording medium, is generated from the calculated inclination amount, hence the tilt servo can be accurately operated even if the gap servo is operated with a small gap between the condensing unit and the optical information recording medium, and information recorded on the optical information recording medium at high density can be stably reproduced with high quality.

In the above optical information reproduction device, it is preferable that the light quantity detection unit includes a light quantity detection unit for decentering detection that detects a light quantity of a part of the return light, in order to detect the fluctuation component of the return light generated due to decentering of the optical information recording medium, the light quantity detection unit for decentering detection is located in a position where the detected light quantity of the part of the return light changes in response to the fluctuation of the return light generated due to decentering of the optical information recording medium, and the tilt error signal generation unit generates the tilt error signal based on the inclination amount and the light quantity of the part of the return light detected by the light quantity detection unit for decentering detection.

According to this configuration, the light quantity detection unit includes a light quantity detection unit for decentering detection that detects a light quantity of a part of the return light, in order to detect the fluctuation component of the return light generated due to decentering of the optical information recording medium. The light quantity detection unit for decentering detection is located in a position where the detected light quantity of the part of the return light changes in response to the fluctuation of the return light generated due to decentering of the optical information recording medium. The tilt error signal generation unit generates the tilt error signal based on the inclination amount and the light quantity of the part of the return light detected by the light quantity detection unit for decentering detection.

Since a light quantity of a part of the return light is detected and the fluctuation component generated on the tilt error signal is removed based on the detection result, the tilt servo can be accurately operated even if the gap servo is operated with a small gap between the condensing unit and the optical information recording medium.

In the above optical information reproduction device, it is preferable that the light quantity detection unit for decentering detection is located in a position where the part of the return light is not detected when the fluctuation of the return light generated due to decentering of the optical information recording medium does not exist.

According to this configuration, it can be determined that the light quantity detected by the light quantity detection unit for decentering detection is all generated by the fluctuation of the return light due to decentering of the optical information recording medium, hence the light quantity in response to the fluctuation of the return light generated due to decentering of the optical information recording medium can be detected more accurately.

In the above optical information reproduction device, it is preferable that the light quantity detection unit includes: a light quantity detection unit for inclination amount detection that detects the light quantity of the return light in order to calculate the inclination amount between the condensing unit and the optical information recording medium; and a light quantity detection unit for decentering detection that detects the light quantity of a part of the return light in order to detect the fluctuation component of the return light generated due to decentering of the optical information recording medium, the light quantity detection unit for inclination amount detection includes a first detection area and a second detection area that are disposed adjacent to each other in a direction where the return light spot is shifted by the fluctuation of the return light generated due to decentering of the optical information recording medium, and the light quantity detection unit for decentering detection includes: a third detection area that is disposed adjacent to the first detection area in the direction where the return light spot is shifted by the fluctuation of the return light generated due to decentering of the optical information recording medium; and a fourth detection area that is disposed adjacent to the second detection area in the direction where the return light spot is shifted by the fluctuation of the return light generated due to decentering of the optical information recording medium.

According to this configuration, the light quantity detection unit includes: a light quantity detection unit for inclination amount detection that detects the light quantity of the return light, in order to calculate the inclination amount between the condensing unit and the optical information recording medium; and a light quantity detection unit for decentering detection that detects the light quantity of a part of the return light, in order to detect the fluctuation component of the return light generated due to decentering of the optical information recording medium. The light quantity detection unit for inclination amount detection includes a first detection area and a second detection area that are disposed adjacent to each other in a direction where the return light spot is shifted by the fluctuation of the return light generated due to decentering of the optical information recording medium. The light quantity detection unit for decentering detection includes: a third detection area that is disposed adjacent to the first detection area in the direction where the return light spot is shifted by the fluctuation of the return light generated due to decentering of the optical information recording medium; and a fourth detection area that is disposed adjacent to the second detection area in the direction where the return light spot is shifted by the fluctuation of the return light generated due to decentering of the optical information recording medium.

Therefore by subtracting a differential signal between an output signal from the third detection area and an output signal from the fourth detection area, which indicates the fluctuation component of the return light generated due to decentering of the optical information recording medium, from a differential signal between an output signal from the first detection area and an output signal from the second detection area, which indicates the inclination amount between the condensing unit and the optical information recording medium, a tilt error signal without a fluctuation component of the return light generated due to decentering of the optical information recording medium can be easily generated.

In the above optical information reproduction device, it is preferable that the tilt error signal generation unit includes an equalization unit that generates the tilt error signal, which is a signal from which a fluctuation component of the return light generated due to decentering of the optical information recording medium is removed, by equalizing the change of the inclination amount calculated by the tilt calculation unit.

According to this configuration, the tilt error signal without a fluctuation component of the return light generated due to decentering of the optical information recording medium is generated by equalizing the change of the inclination amount. Since it is unnecessary to independently install the light quantity detection unit for detecting a fluctuation component of the return light generated due to decentering of the optical information recording medium, the tilt servo can be accurately operated with a simple optical system configuration.

In the above optical information reproduction device, it is preferable that the light quantity detection unit includes a light quantity detection area that receives the return light spot, the light quantity detection area is divided into a first detection area and a second detection area, the first detection area and the second detection area are located in positions where a surface area of the spot of light received by the first detection area and a surface area of the spot of light received by the second detection area are the same when the fluctuation of the return light generated due to decentering of the optical information recording medium does not exist and the spot is not shifted, and where a surface area of the spot of light received by the first detection area and a surface area of the spot of light received by the second detection area change in response to the fluctuation of the return light when the fluctuation of the return light generated due to decentering of the optical information recording medium exists and the spot is shifted, the light quantity detection unit outputs a first signal in response to the light quantity of the spot of light received by the first detection area, and outputs a second signal in response to the light quantity of the spot of light received by the second detection area, the tilt calculation unit outputs a differential signal, which indicates a difference between the first signal and the second signal, as the inclination amount, and the equalization unit generates the tilt error signal by equalizing the differential signal.

According to this configuration, the light quantity detection unit includes a light quantity detection area that receives the return light spot, and the light quantity detection area is divided into a first detection area and a second detection area. The first detection area and the second detection area are located in positions where a surface area of the spot of light received by the first detection area and a surface area of the spot of light received by the second detection area are the same if the fluctuation of the return light generated due to decentering of the optical information recording medium do not exist and the spot is not shifted, and a surface area of the spot of light received by the first detection area and a surface area of the spot of light received by the second detection area change in response to the fluctuation of the return light if the fluctuation of the return light generated due to decentering of the optical information recording medium exists and the spot is shifted. The light quantity detection unit outputs a first signal in response to the light quantity of the spot of light received by the first detection area, and outputs a second signal in response to the light quantity of the spot of light received by the second detection area. The tilt calculation unit outputs a differential signal, which indicates a difference between the first signal and the second signal, as the inclination amount, and the equalization unit generates the tilt error signal by equalizing the differential signal.

Since the differential signal obtained from the divided first detection area and the second detection area is equalized, the tilt servo can be accurately operated even if the gap servo is operated with a small gap between the condensing unit and the optical information recording medium. Furthermore, the light quantity detection unit for detecting the fluctuation component of the return light generated due to decentering of the optical information recording medium need not be installed independently, hence the tilt servo can be accurately operated with a simple optical system configuration.

In the optical information reproduction device, it is preferable that the light quantity detection area is divided into the first detection area and the second detection area along a line that passes through a center point of the return light spot in the case when the fluctuation of the return light generated due to decentering of the optical information recording medium does not exist, and that is perpendicular to the direction where the return light spot is shifted by fluctuation of the return light generated due to decentering of the optical information recording medium.

According to this configuration, the light quantity detection area is divided into the first detection area and the second detection area along a line that passes through a center point of the return light spot in the case when the fluctuation of the return light generated due to decentering of the optical information recording medium does not exist, and is perpendicular to the direction where the return light spot is shifted by fluctuation of the return light generated due to decentering of the optical information recording medium.

Therefore a tilt error signal without the fluctuation component of the return light generated due to decentering of the optical information recording medium can be generated by equalizing the differential signal, which indicates the difference between the first signal from the first detection area and the second signal from the second detection area.

In the above optical information reproduction device, it is preferable that the equalization unit delimits equalization time by an integral multiple of time for the optical information recording medium to rotate once.

According to this configuration, the equalization can be accurately performed even if equalization in a short time is required.

It is preferable that the above optical information reproduction device further comprises: a tracking control unit that outputs drive current for shifting the condensing unit in a radius direction of the optical information recording medium; an actuator that adjusts the position of the condensing unit in response to the drive current; and a drive current detection unit that detects the drive current outputted by the tracking control unit, wherein the tracking control unit changes the drive current in response to the fluctuation of the return light generated due to decentering of the optical information recording medium, and the tilt error signal generation unit generates the tilt error signal based on the inclination amount calculated by the tilt calculation unit and the drive current detection result detected by the drive current detection unit.

According to this configuration, the tracking control unit outputs drive current for shifting the condensing unit in the radius direction of the optical information recording medium. The actuator adjusts the position of the condensing unit in response to the drive current. The drive current detection unit detects the drive current outputted by the tracking control unit. The tracking control unit changes the drive current in response to the fluctuation of the return light generated due to decentering of the optical information recording medium. The tilt error signal generation unit generates the tilt error signal based on the inclination amount calculated by the tilt calculation unit and the drive current detection result detected by the drive current detection unit.

Therefore the drive current for shifting the condensing unit in the radius direction of the optical information recording medium is detected, and the fluctuation component generated in the tilt error signal is removed based on the drive current detection result. Since the light quantity detection unit for detecting the fluctuation component of the return light generated due to decentering of the optical information recording medium need not be installed independently, the tilt servo can be accurately operated with a simple optical system configuration.

In the above optical information reproduction device, it is preferable that the light quantity detection unit includes the light quantity detection area that receives a return light spot, the light quantity detection area is divided into a first detection area and a second detection area, the first detection area and the second detection area are located in positions where a surface area of the spot of light received by the first detection area and a surface area of the spot of light received by the second detection area are the same when the fluctuation of the return light generated due to decentering of the optical information recording medium does not exist, and the spot is not shifted, and where a surface area of the spot of light received by the first detection area and a surface area of the spot of light received by the second detection area change in response to the fluctuation of the return light when the fluctuation of the return light generated due to decentering of the optical information recording medium exists, and the spot is shifted, the light quantity detection unit outputs a first signal in response to the light quantity of the spot of light received by the first detection area, and outputs a second signal in response to the light quantity of the spot of light received by the second detection area, the tilt calculation unit outputs a differential signal, which indicates a difference between the first signal and the second signal, as the inclination amount, and the tilt error signal generation unit generates the tilt error signal based on the drive current detection result detected by the drive current detection unit and the differential signal.

According to this configuration, the light quantity detection unit includes the light quantity detection area that receives a return light spot, and the light quantity detection area is divided into a first detection area and a second detection area. The first detection area and the second detection area are located in positions where a surface area of the spot of light received by the first detection area and a surface area of the spot of light received by the second detection area are the same if the fluctuation of the return light generated due to decentering of the optical information recording medium does not exist and the spot is not shifted, and a surface area of the spot of light received by the first detection area and a surface area of the spot of light received by the second detection area change in response to the fluctuation of the return light if the fluctuation of the return light generated due to decentering of the optical information recording medium exists and the spot is shifted. The light quantity detection unit outputs a first signal in response to the light quantity of the spot of light received by the first detection area, and outputs a second signal in response to the light quantity of the spot of light received by the second detection area. The tilt calculation unit outputs a differential signal, which indicates a difference between the first signal and the second signal, as the inclination amount. The tilt error signal generation unit generates the tilt error signal based on the drive current detection result detected by the drive current detection unit and the differential signal.

Since the tilt error signal is generated based on the drive current detection result and the differential signal obtained from the divided first detection area and the second detection area, the tilt servo can be accurately operated even if the gap servo is operated with a small gap between the condensing unit and the optical information recording medium. Furthermore, the light quantity detection unit for detecting the fluctuation component of the return light generated due to decentering of the optical information recording medium need not be installed independently, hence the tilt servo can be accurately operated with a simple optical system configuration. Even if the inclination amount between the optical information recording medium and the condensing unit fluctuate while the optical information recording medium rotates once, the error component can be removed from the inclination amount with following up the fluctuation of the inclination amount.

In the above optical information reproduction device, it is preferable that the light quantity detection area is divided into the first detection area and the second detection area along a line that passes through a center point of the return light spot in the case when the fluctuation of the return light generated due to decentering of the optical information recording medium does not exist, and that is perpendicular to the direction where the return light spot is shifted by fluctuation of the return light generated due to decentering of the optical information recording medium.

According to this configuration, the light quantity detection area is divided into the first detection area and the second detection area along a line that passes through a center point of the return light spot in the case when the fluctuation of the return light generated due to decentering of the optical information recording medium does not exist, and is perpendicular to the direction where the return light spot is shifted by fluctuation of the return light generated due to decentering of the optical information recording medium.

Therefore by subtracting the drive current detection result from the differential signal, which indicates a difference between the first signal from the first detection area and the second signal from the second detection area, a tilt error signal without a fluctuation component of the return light generated due to decentering of the optical information recording medium can be generated.

In the optical information reproduction device, it is preferable that the condensing unit includes a solid immersion lens that has an emitting surface facing the surface of the optical information recording medium, and the area where the near-field light is generated is an area near the emitting surface of the solid immersion lens.

According to this configuration, the near-field light is generated by the solid immersion lens, and the gap between the condensing unit and the optical information recording medium can be controlled based on the light quantity of the return light from an area near the emitting surface of the solid immersion lens.

An optical information recording device according to another aspect of the present invention is an optical information recording device for recording information on an optical information recording medium, comprising: a light source that emits a laser beam; a condensing unit that generates a near-field light and condenses the laser beam on the optical information recording medium; a rotation unit that rotates the optical information recording medium; a light quantity detection unit that detects light quantity of return light from an area where the near-field light is generated; a gap control unit that controls a gap between the condensing unit and the optical information recording medium based on the light quantity of the return light detected by the light quantity detection unit; a tilt calculation unit that calculates, in a state of controlling the gap by the gap control unit, an inclination amount between the condensing unit and the optical information recording medium based on the light quantity of the return light detected by the light quantity detection unit; a tilt error signal generation unit that generates from the inclination amount calculated by the tilt calculation unit a tilt error signal, which is a signal from which a fluctuation component of the return light generated due to decentering of the optical information recording medium; and a tilt control unit that controls the inclination between the condensing unit and the optical information recording medium based on the tilt error signal generated by the tilt error signal generation unit.

According to this configuration, the light source emits a laser beam, and the condensing unit generates a near-field light and condenses the laser beam on the optical information recording medium. The rotation unit rotates the optical information recording medium. The light quantity detection unit detects light quantity of return light from an area where the near-field light is generated. The gap control unit controls a gap between the condensing unit and the optical information recording medium based on the light quantity of the return light detected by the light quantity detection unit. The tilt calculation unit calculates, in a state of the gap control unit controlling the gap, an inclination amount between the condensing unit and the optical information recording medium based on the light quantity of the return light detected by the light quantity detection unit. The tilt error signal generation unit generates a tilt error signal, which is a signal without a fluctuation component of the return light generated due to decentering of the optical information recording medium, from the inclination amount calculated by the tilt calculation unit. The tilt control unit controls the inclination beteen the condensing unit and the optical information recording medium based on the tilt error signal generated by the tilt error signal generation unit.

Therefore an inclination amount between the condensing unit and the optical information recording medium is calculated based on the light quantity of the return light, in a state of controlling the gap, and the tilt error signal, which is a signal without a fluctuation component of the return light due to decentering of the optical information recording medium, is generated from the calculated inclination amount, hence the tilt servo can be accurately operated even if the gap servo is operated with a small gap between the condensing unit and the optical information recording medium, and information can be stably recorded on the optical information at high density with high quality.

An optical information reproduction method according to another aspect of the present invention is an optical information reproduction method for reproducing information from an optical information recording medium, comprising: an emission step of emitting a laser beam; a condensing step of generating a near-field light and condensing the laser beam on the optical information recording medium by using a condensing unit; a rotation step of rotating the optical information recording medium; a light quantity detection step of detecting light quantity of return light from an area where the near-field light is generated;
a gap control step of controlling a gap between the condensing unit and the optical information recording medium based on the light quantity of the return light detected in the light quantity detection step; a tilt calculation step of calculating, in a state of controlling the gap in the gap control step, an inclination amount between the condensing unit and the optical information recording medium based on the light quantity of the return light detected in the light quantity detection step; a tilt error signal generation step of generating from the inclination amount calculated in the tilt calculation step a tilt error signal, which is a signal from which a fluctuation component of the return light generated due to decentering of the optical information recording medium; and a tilt control step of controlling the inclination between the condensing unit and the optical information recording medium based on the tilt error signal generated in the tilt error signal generation step.

According to this configuration, in the emission step, a laser beam is emitted, and in the condensing step, a near-field light is generated and the laser beam is condensed on the optical information recording medium using the condensing unit. In the rotation step, the optical information recording medium is rotated. In the light quantity detection step, the light quantity of return light from an area where the near-field light is generated is detected. In the gap control step, a gap between the condensing unit and the optical information recording medium is controlled based on the light quantity of the return light detected in the light quantity detection step. In the tilt calculation step, an inclination amount between the condensing unit and the optical information recording medium is calculated based on the light quantity of the return light detected in the light quantity detection step, in a state of controlling the gap in the gap control step. In the tilt error signal generation step, a tilt error signal, which is a signal without a fluctuation component of the return light generated due to decentering of the optical information recording medium, is generated from the inclination amount calculated in the tilt calculation step. In the tilt control step, the inclination between the condensing unit and the optical information recording medium is controlled based on the tilt error signal generated in the tilt error signal generation step.

Therefore an inclination amount between the condensing unit and the optical information recording medium is calculated based on the light quantity of the return light, in a state of controlling the gap, and the tilt error signal, which is a signal without a fluctuation component of the return light due to decentering of the optical information recording medium, is generated from the calculated inclination amount, hence the tilt servo can be accurately operated even if the gap servo is operated with a small gap between the condensing unit and the optical information recording medium, and information recorded on the optical information recording medium at high density can be stably reproduced with high quality.

An optical information recording method according to another aspect of the present invention is an optical information recording method for recording information on an optical information recording medium, comprising: an emission step of emitting a laser beam; a condensing step of generating a near-field light and condensing the laser beam on the optical information recording medium by using a condensing unit; a rotation step of rotating the optical information recording medium; a light quantity detection step of detecting light quantity of return light from an area where the near-field light is generated; a gap control step of controlling a gap between the condensing unit and the optical information recording medium based on the light quantity of the return light detected in the light quantity detection step; a tilt calculation step of calculating, in a state of controlling the gap in the gap control step, an inclination amount between the condensing unit and the optical information recording medium based on the light quantity of the return light detected in the light quantity detection step; a tilt error signal generation step of generating from the inclination amount calculated in the tilt calculation step a tilt error signal, which is a signal from which a fluctuation component of the return light generated due to decentering of the optical information recording medium is removed; and a tilt control step of controlling the inclination between the condensing unit and the optical information recording medium based on the tilt error signal generated in the tilt error signal generation step.

According to this configuration, in the emission step, a laser beam is emitted, and in the condensing step, a near-field light is generated and the laser beam is condensed on the optical information recording medium using the condensing unit. In the rotation step, the optical information recording medium is rotated. In the light quantity detection step, the light quantity of return light from an area where the near-field light is generated is detected. In the gap control step, a gap between the condensing unit and the optical information recording medium is controlled based on the light quantity of the return light detected in the light quantity detection step. In the tilt calculation step, an inclination amount between the condensing unit and the optical information recording medium is calculated based on the quantity of the return light detected in the light quantity detection step, in a state of controlling the gap in the gap control step. In the tilt error signal generation step, a tilt error signal, which is a signal without a fluctuation component of the return light generated due to decentering of the optical information recording medium, is generated from the inclination amount calculated in the tilt calculation step. In the tilt control step, the inclination between the condensing unit and the optical information recording medium is controlled based on the tilt error signal generated in the tilt error signal generation step.

Therefore an inclination amount between the condensing unit and the optical information recording medium is calculated based on the light quantity of the return light, in a state of controlling the gap, and the tilt error signal, which is a signal without a fluctuation component of the return light due to decentering of the optical information recording medium, is generated from the calculated inclination amount, hence the tilt servo can be accurately operated even if the gap servo is operated with a small gap between the condensing unit and the optical information recording medium, and information can be stably recorded on the optical information recording medium at high density with high quality.

The embodiments and examples of the present invention that have been described are merely for clarifying the technical content of the invention, and are not intended to limit the invention to these examples. Numerous modifications and variations can be made without departing from the true spirit of the invention and scope of the Claims.

INDUSTRIAL APPLICABILITY

The optical information reproduction device, the optical information recording device, the optical information reproduction method and the optical information recording method according to the present invention allow the tilt servo to accurately operate even if the gap servo is operated with a small gap. The present invention is particularly useful in the fields related to control of a recording/reproduction device, an optical information recording device, an optical information reproduction method and an optical information recording method that use near-field light.

The invention claimed is:

1. An optical information reproduction device for reproducing information from an optical information recording medium, comprising:
   a light source that emits a laser beam;
   a condensing unit that generates a near-field light and condenses the laser beam on the optical information recording medium;
   a rotation unit that rotates the optical information recording medium;
   a light quantity detection unit that detects light quantity of return light from an area where the near-field light is generated;
   a gap control unit that controls a gap between the condensing unit and the optical information recording medium based on the light quantity of the return light detected by the light quantity detection unit;
   a tilt calculation unit that calculates, in a state where the gap is controlled by the gap control unit, an inclination amount between the condensing unit and the optical information recording medium based on the light quantity of the return light detected by the light quantity detection unit;
   a tilt error signal generation unit that generates from the inclination amount calculated by the tilt calculation unit a tilt error signal, which is a signal from which a fluctuation component of the return light generated due to decentering of the optical information recording medium is removed; and
   a tilt control unit that controls the inclination between the condensing unit and the optical information recording medium based on the tilt error signal generated by the tilt error signal generation unit, wherein
   the light quantity detection unit includes a light quantity detection unit for decentering detection that detects a light quantity of a part of the return light, in order to detect the fluctuation component of the return light generated due to decentering of the optical information recording medium,
   the light quantity detection unit for decentering detection is located in a position where the detected light quantity of the part of the return light changes in response to the fluctuation of the return light generated due to decentering of the optical information recording medium, and
   the tilt error signal generation unit generates the tilt error signal based on the inclination amount and the light quantity of the part of the return light detected by the light quantity detection unit for decentering detection.

2. The optical information reproduction device according to claim 1, wherein
   the light quantity detection unit for decentering detection is located in a position where the part of the return light is not detected when the fluctuation of the return light generated due to decentering of the optical information recording medium does not exist.

3. An optical information reproduction device for reproducing information from an optical information recording medium, comprising:
   a light source that emits a laser beam;
   a condensing unit that generates a near-field light and condenses the laser beam on the optical information recording medium;
   a rotation unit that rotates the optical information recording medium;
   a light quantity detection unit that detects light quantity of return light from an area where the near-field light is generated;
   a gap control unit that controls a gap between the condensing unit and the optical information recording medium based on the light quantity of the return light detected by the light quantity detection unit;
   a tilt calculation unit that calculates, in a state where the gap is controlled by the gap control unit, an inclination amount between the condensing unit and the optical information recording medium based on the light quantity of the return light detected by the light quantity detection unit;
   a tilt error signal generation unit that generates from the inclination amount calculated by the tilt calculation unit a tilt error signal, which is a signal from which a fluctuation component of the return light generated due to decentering of the optical information recording medium is removed; and
   a tilt control unit that controls the inclination between the condensing unit and the optical information recording medium based on the tilt error signal generated by the tilt error signal generation unit, wherein the light quantity detection unit includes: a light quantity detection unit for inclination amount detection that detects the light quantity of the return light in order to calculate the inclination amount between the condensing unit and the optical information recording medium; and a light quantity detection unit for decentering detection that detects the light quantity of a part of the return light in order to detect the fluctuation component of the return light generated due to decentering of the optical information recording medium, the light quantity detection unit for inclination amount detection includes a first detection area and a second detection area that are disposed adjacent to each other in a direction where a return light spot is shifted by the fluctuation of the return light generated due to decentering of the optical information recording medium, and the light quantity detection unit for decentering detection includes a third detection area that is disposed adjacent to the first detection area in the direction where the return light spot is shifted by the fluctuation of the return light generated due to decentering of the optical information recording medium; and a fourth detection area that is disposed adjacent to the second detection area in the direction where the return light spot is shifted by the fluctuation of the return light generated due to decentering of the optical information recording medium.

4. An optical information reproduction device for reproducing information from an optical information recording medium, comprising:

a light source that emits a laser beam;

a condensing unit that generates a near-field light and condenses the laser beam on the optical information recording medium;

a rotation unit that rotates the optical information recording medium;

a light quantity detection unit that detects light quantity of return light from an area where the near-field light is generated;

a gap control unit that controls a gap between the condensing unit and the optical information recording medium based on the light quantity of the return light detected by the light quantity detection unit;

a tilt calculation unit that calculates, in a state where the gap is controlled by the gap control unit, an inclination amount between the condensing unit and the optical information recording medium based on the light quantity of the return light detected by the light quantity detection unit;

a tilt error signal generation unit that generates from the inclination amount calculated by the tilt calculation unit a tilt error signal, which is a signal from which a fluctuation component of the return light generated due to decentering of the optical information recording medium is removed; and a tilt control unit that controls the inclination between the condensing unit and the optical information recording medium based on the tilt error signal generated by the tilt error signal generation unit, wherein the tilt error signal generation unit includes an equalization unit that generates the tilt error signal, which is a signal from which a fluctuation component of the return light generated due to decentering of the optical information recording medium is removed, by equalizing the change of the inclination amount calculated by the tilt calculation unit.

5. The optical information reproduction device according to claim 4, wherein the light quantity detection unit includes a light quantity detection area that receives the return light spot, the light quantity detection area is divided into a first detection area and a second detection area, the first detection area and the second detection area are located in positions where a surface area of the spot of light received by the first detection area and a surface area of the spot of light received by the second detection area are the same when the fluctuation of the return light generated due to decentering of the optical information recording medium does not exist and the spot is not shifted, and where a surface area of the spot of light received by the first detection area and a surface area of the spot of light received by the second detection area change in response to the fluctuation of the return light when the fluctuation of the return light generated due to decentering of the optical information recording medium exists and the spot is shifted, the light quantity detection unit outputs a first signal in response to the light quantity of the spot of light received by the first detection area, and outputs a second signal in response to the light quantity of the spot of light received by the second detection area, the tilt calculation unit outputs a differential signal, which indicates a difference between the first signal and the second signal, as the inclination amount, and the equalization unit generates the tilt error signal by equalizing the differential signal.

6. The optical information reproduction device according to claim 5, wherein the light quantity detection area is divided into the first detection area and the second detection area along a line that passes through a center point of the return light spot in the case when the fluctuation of the return light generated due to decentering of the optical information recording medium does not exist, and that is perpendicular to the direction where the return light spot is shifted by fluctuation of the return light generated due to decentering of the optical information recording medium.

7. The optical information reproduction device according to claim 4, wherein the equalization unit delimits equalization time by an integral multiple of time for the optical information recording medium to rotate once.

8. An optical information reproduction device for reproducing information from an optical information recording medium, comprising:

a light source that emits a laser beam;

a condensing unit that generates a near-field light and condenses the laser beam on the optical information recording medium;

a rotation unit that rotates the optical information recording medium;

a light quantity detection unit that detects light quantity of return light from an area where the near-field light is generated;

a gap control unit that controls a gap between the condensing unit and the optical information recording medium based on the light quantity of the return light detected by the light quantity detection unit;

a tilt calculation unit that calculates, in a state where the gap is controlled by the gap control unit, an inclination amount between the condensing unit and the optical information recording medium based on the light quantity of the return light detected by the light quantity detection unit;

a tilt error signal generation unit that generates from the inclination amount calculated by the tilt calculation unit a tilt error signal, which is a signal from which a fluctuation component of the return light generated due to decentering of the optical information recording medium is removed;

a tilt control unit that controls the inclination between the condensing unit and the optical information recording medium based on the tilt error signal generated by the tilt error signal generation unit;

a tracking control unit that outputs drive current for shifting the condensing unit in a radius direction of the optical information recording medium;

an actuator that adjusts the position of the condensing unit in response to the drive current; and a drive current detection unit that detects the drive current outputted by the tracking control unit, wherein the tracking control unit changes the drive current in response to the fluctuation of the return light generated due to decentering of the optical information recording medium, and the tilt error signal generation unit generates the tilt error signal based on the inclination amount calculated by the tilt calculation unit and the drive current detection result detected by the drive current detection unit.

9. The optical information reproduction device according to claim 8, wherein the light quantity detection unit includes the light quantity detection area that receives a return light spot, the light quantity detection area is divided into a first detection area and a second detection area, the first detection area and the second detection area are located in positions where a surface area of the spot of light received by the first detection area and a surface area of the spot of light received by the second detection area are the same when the fluctuation of the return light generated due to decentering of the optical information recording medium does not exist and the spot is not shifted, and where a surface area of the spot of light received by the first detection area and a surface area of the spot of light received by the second detection area change in response to the fluctuation of the return light when the fluctuation of the return light generated due to decentering of the optical information recording medium exists and the spot is shifted, the light quantity detection unit outputs a first signal in response to the light quantity of the spot of light received by the first detection area, and outputs a second signal in response to the light quantity of the spot of light received by the second detection area, the tilt calculation unit outputs a differential signal, which indicates a difference between the first signal and the second signal, as the inclination amount, and the tilt error signal generation unit generates the tilt error signal based on the drive current detection result detected by the drive current detection unit and the differential signal.

10. The optical information reproduction device according to claim 9, wherein the light quantity detection area is divided into the first detection area and the second detection area along a line that passes through a center point of the return light spot in the case when the fluctuation of the return light generated due to decentering of the optical information recording medium does not exist, and that is perpendicular to the direction where the return light spot is shifted by fluctuation of the return light generated due to decentering of the optical information recording medium.

11. The optical information reproduction device according to claim 1, wherein the condensing unit includes a solid immersion lens that has an emitting surface facing the surface of the optical information recording medium, and the area where the near-field light is generated is an area near the emitting surface of the solid immersion lens.

12. An optical information recording device for recording information on an optical information recording medium, comprising:

a light source that emits a laser beam;

a condensing unit that generates a near-field light and condenses the laser beam on the optical information recording medium;

a rotation unit that rotates the optical information recording medium;

a light quantity detection unit that detects light quantity of return light from an area where the near-field light is generated;

a gap control unit that controls a gap between the condensing unit and the optical information recording medium based on the light quantity of the return light detected by the light quantity detection unit;

a tilt calculation unit that calculates, in a state where the gap is controlled by the gap control unit, an inclination amount between the condensing unit and the optical information recording medium based on the light quantity of the return light detected by the light quantity detection unit;

a tilt error signal generation unit that generates from the inclination amount calculated by the tilt calculation unit a tilt error signal, which is a signal from which a fluctuation component of the return light generated due to decentering of the optical information recording medium; and a tilt control unit that controls the inclination between the condensing unit and the optical information recording medium based on the tilt error signal generated by the tilt error signal generation unit, wherein the light quantity detection unit includes a light quantity detection unit for decentering detection that detects a light quantity of a part of the return light, in order to detect the fluctuation component of the return light generated due to decentering of the optical information recording medium, the light quantity detection unit for decentering detection is located in a position where the detected light quantity of the part of the return light changes in response to the fluctuation of the return light generated due to decentering of the optical information recording medium, and the tilt error signal generation unit generates the tilt error signal based on the inclination amount and the light quantity of the part of the return light detected by the light quantity detection unit for decentering detection.

13. An optical information reproduction method for reproducing information from an optical information recording medium, comprising:

an emission step of emitting a laser beam;

a condensing step of generating a near-field light and condensing the laser beam on the optical information recording medium by using a condensing unit;

a rotation step of rotating the optical information recording medium;

a light quantity detection step of detecting light quantity of return light from an area where the near-field light is generated;

a gap control step of controlling a gap between the condensing unit and the optical information recording medium based on the light quantity of the return light detected in the light quantity detection step;

a tilt calculation step of calculating, in a state of controlling the gap in the gap control step, an inclination amount between the condensing unit and the optical information recording medium based on the light quantity of the return light detected in the light quantity detection step;

a tilt error signal generation step of generating from the inclination amount calculated in the tilt calculation step a tilt error signal, which is a signal from which a fluctuation component of the return light generated due to decentering of the optical information recording medium is removed; and a tilt control step of controlling the inclination between the condensing unit and the optical information recording medium based on the tilt error signal generated in the tilt error signal generation step, wherein the light quantity detection step includes a light quantity detection step for decentering detection that detects a light quantity of a part of the return light by a light quantity detection unit for decentering detection, in order to detect the fluctuation component of the return light generated due to decentering of the optical information recording medium, the light quantity detection unit for decentering detection is located in a position where the detected light quantity of the part of the return light changes in response to the fluctuation of the return light generated due to decentering of the optical information recording medium, and the tilt error signal generation step generates the tilt error signal based on the inclination amount and the light quantity of the part of the return light detected by the light quantity detection unit for decentering detection.

14. An optical information recording method for recording information on an optical information recording medium, comprising:

an emission step of emitting a laser beam;

a condensing step of generating a near-field light and condensing the laser beam on the optical information recording medium by using a condensing unit;

a rotation step of rotating the optical information recording medium;

a light quantity detection step of detecting light quantity of return light from an area where the near-field light is generated;

a gap control step of controlling a gap between the condensing unit and the optical information recording medium based on the light quantity of the return light detected in the light quantity detection step;

a tilt calculation step of calculating, in a state of controlling the gap in the gap control step, an inclination amount between the condensing unit and the optical information recording medium based on the light quantity of the return light detected in the light quantity detection step;

a tilt error signal generation step of generating from the inclination amount calculated in the tilt calculation step a tilt error signal, which is a signal from which a fluctuation component of the return light generated due to decentering of the optical information recording medium is removed; and a tilt control step of controlling the inclination between the condensing unit and the optical information recording medium based on the tilt error signal generated in the tilt error signal generation step, wherein the light quantity detection step includes a light quantity detection step for decentering detection that detects a light quantity of a part of the return light by a light quantity detection unit for decentering detection, in order to detect the fluctuation component of the return light generated due to decentering of the optical information recording medium, the light quantity detection unit for decentering detection is located in a position where the detected light quantity of the part of the return light changes in response to the fluctuation of the return light generated due to decentering of the optical information recording medium, and the tilt error signal generation step generates the tilt error signal based on the inclination amount and the light quantity of the part of the return light detected by the light quantity detection unit for decentering detection.

\* \* \* \* \*